Feb. 16, 1960     A. A. ROBINSON ET AL     2,925,218
INSTRUCTION CONTROLLED SHIFTING DEVICE
Filed Nov. 15, 1954                           11 Sheets-Sheet 8
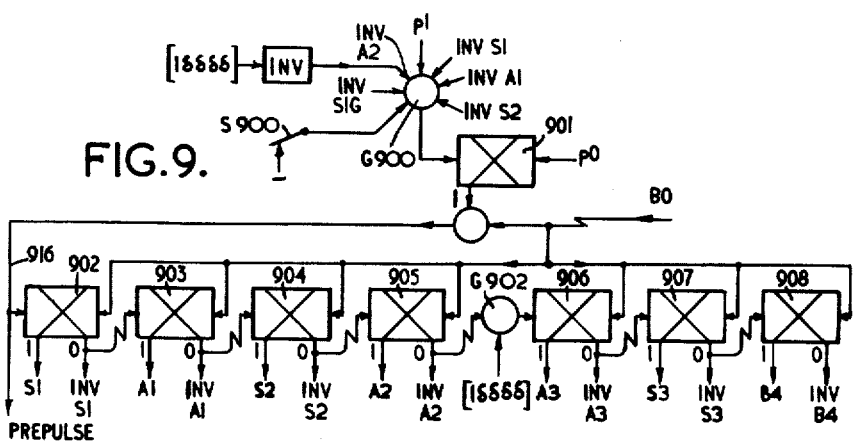
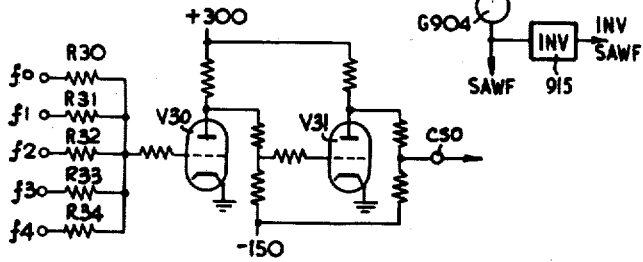
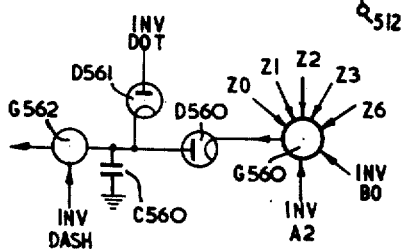
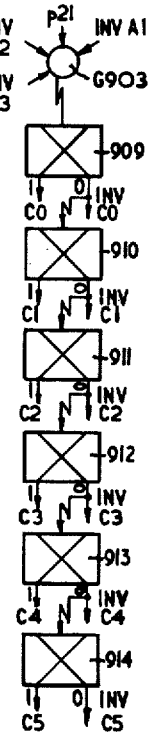
INVENTORS:
ARTHUR A. ROBINSON
JOHN LEECH
By Stevens, Davis, Miller & Mosher
Attorneys

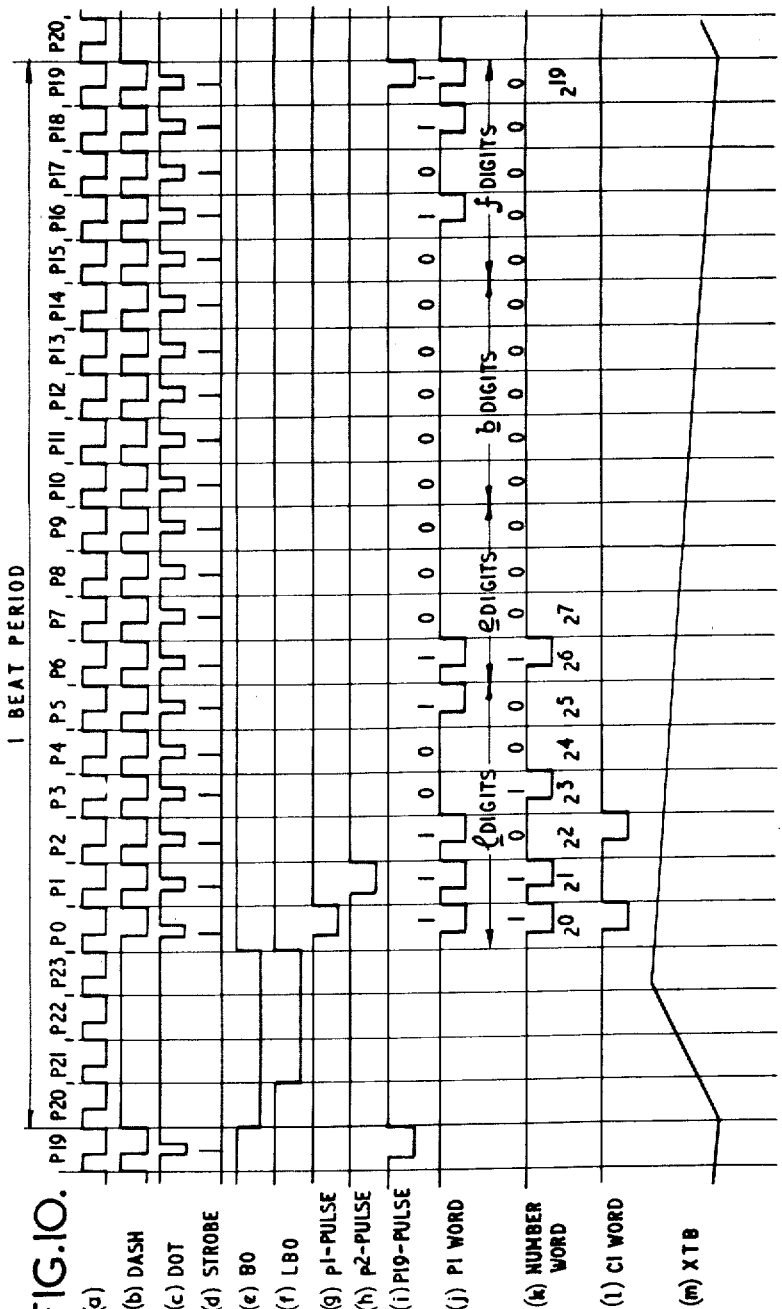

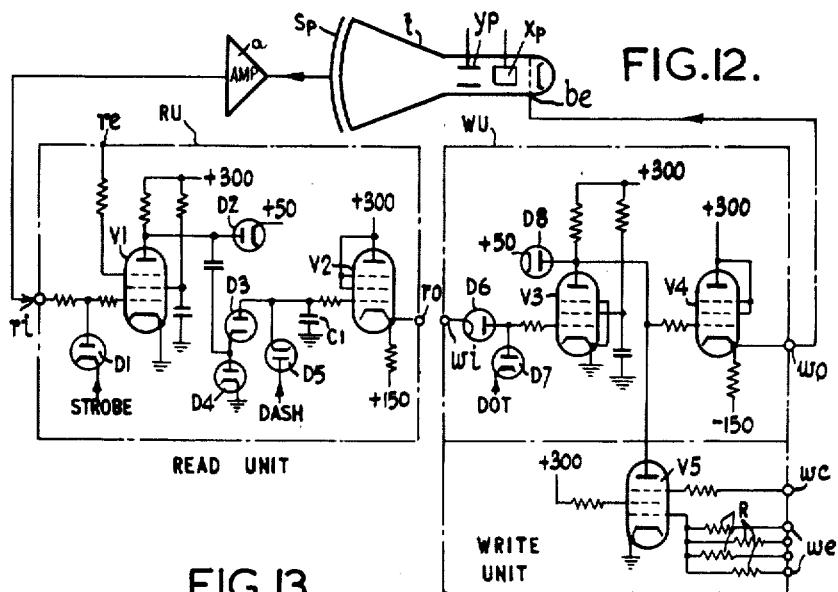
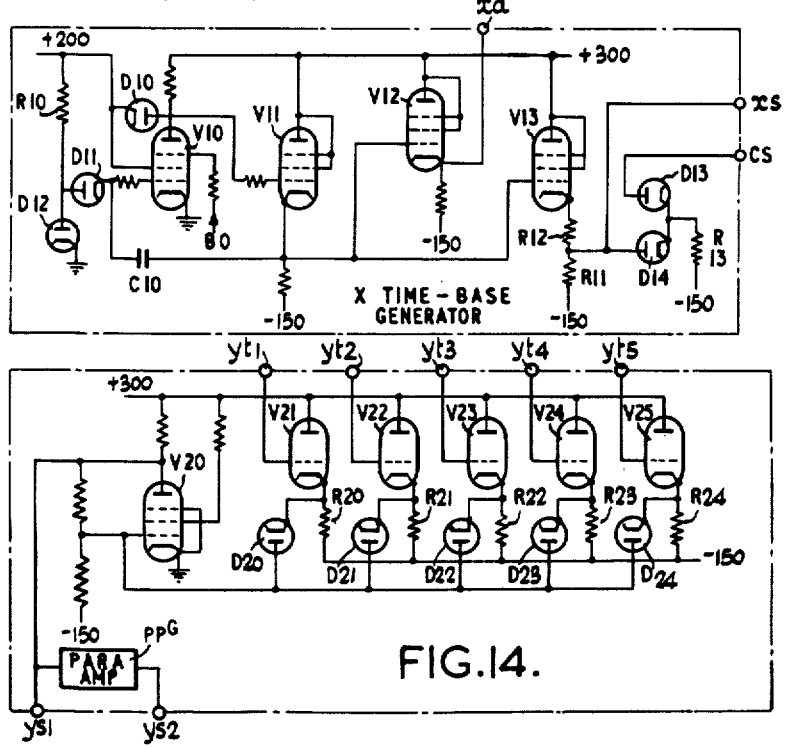

United States Patent Office

2,925,218
Patented Feb. 16, 1960

2,925,218

INSTRUCTION CONTROLLED SHIFTING DEVICE

Arthur Alexander Robinson, Manchester, and John Leech, Cambridge, England, assignors, by mesne assignments, to International Business Machines Corporation, New York, N.Y., a corporation of New York Application November 15, 1954, Serial No. 468,924

Claims priority, application Great Britain November 20, 1953

9 Claims. (Cl. 235—157)

This invention relates to electronic digital computing machines and is more particularly concerned with machines which operate, at least in part, in the serial mode with number words represented by electric pulse signal trains, the significance of the various pulses of such trains being determined by the relationship of their timing with respect to the operational timing cycle or rhythm of the computing machine.

The invention is particularly, although by no means exclusively, adapted for use with binary digital computing machines of the kind described in F. C. Williams et al. copending patent application Serial No. 226,761, filed May 17, 1951, now Patent No. 2,840,304.

Objects of the invention are to provide arrangements for affording a facility for shifting, by some predetermined amount, the positional timing of a number signal relative to the aforesaid rhythm of the machine, and thereby altering its represented numerical value, under the control of a machine instruction and, preferably, also for producing again under the control of a machine instruction, such a degree of shifting as will bring the most significant "1" or other chosen digit of a number signal into a predetermined positional relationship to a given timing position of the machine rhythm (representative, for instance, of the binary point) and then providing an output signal which is indicative of the amount and direction of shift which has been imposed. Such last described operation will hereinafter be referred to as a "standardising" operation.

In accordance with the broadest aspect of the invention the shifting arrangements comprise a number signal storage device having a plurality of separately and immediately accessible storage locations for each of the individual digits of the number signal to be dealt with and address selecting means for such storage device, said address selecting means including a cyclic counting means whereby each digit storage location of such storage device can be rendered operative in turn at the digit signalling rhythm of the machine and over-riding setting means by which the address location setting of such cyclic counting means can be altered to any desired address defining setting by external control signals.

In a preferred form such storage device comprises an electrostatic cathode ray tube storage device of the kind described by F. C. Williams and T. Kilburn in Proc. I.E.E., March 1949, Part II, pp. 81–100 and other subsequent literature. The address selecting means conveniently comprises a series of two-stable-state trigger circuits which are counter-connected as a chain and have their respective outputs arranged to control the generation of X, or X and Y, deflection potentials for the beam of the cathode ray tube storage device through the intermediary of one, or two, devices including a current summation valve resembling that described in connection with the Y-shift valve of Figure 23 of the aforesaid publication reference.

In order that the nature of the invention may be more readily understood one particular embodiment thereof will now be described with reference to the accompanying drawings in which:

Figs. 8 and 9 are similar more detailed block schematic diagrams showing respectively the arrangements of the basic waveform generators and the control waveform generators of the unit WGU of Fig. 1.

Figure 11:
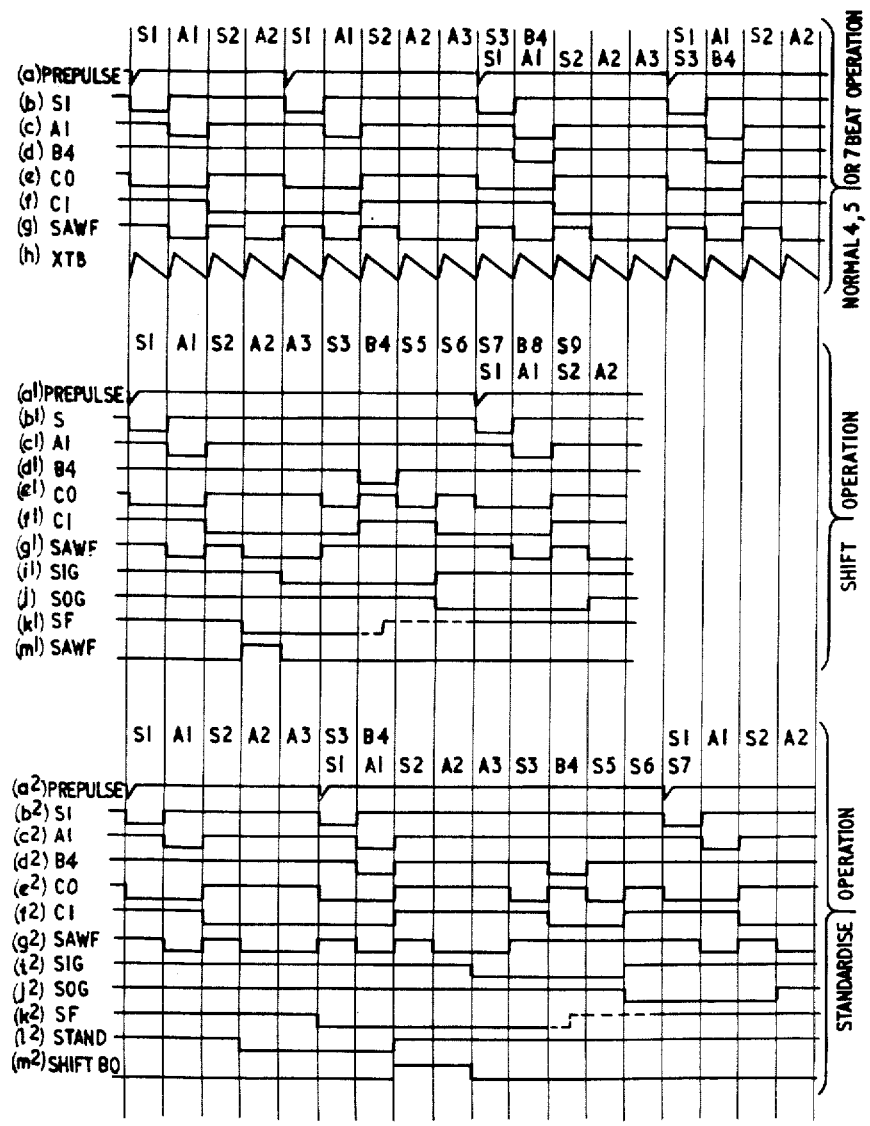

Figs. 10 and 11 each show a series of waveform diagrams related to the operation of the machine and of the shifting arrangements of the present invention.

Fig. 12 is a more detailed circuit diagram of a typical cathode ray tube storage unit with its associated read and write units.

Fig. 13 is a detailed circuit diagram of the X-time base and column shift arrangements associated with the beam deflection of a cathode ray storage tube.

Fig. 14 is a detailed circuit diagram of a typical Y-time base deflection circuit for a cathode ray storage tube.

Fig. 15 is a circuit diagram of a decoder device as used in the machine for generating a gate control voltage from a particular setting configuration of the group of function staticisor devices.

Fig. 16 is a circuit diagram of a "non-equivalence" detecting circuit forming part of the shift counter circuits SC.

Figure 5:
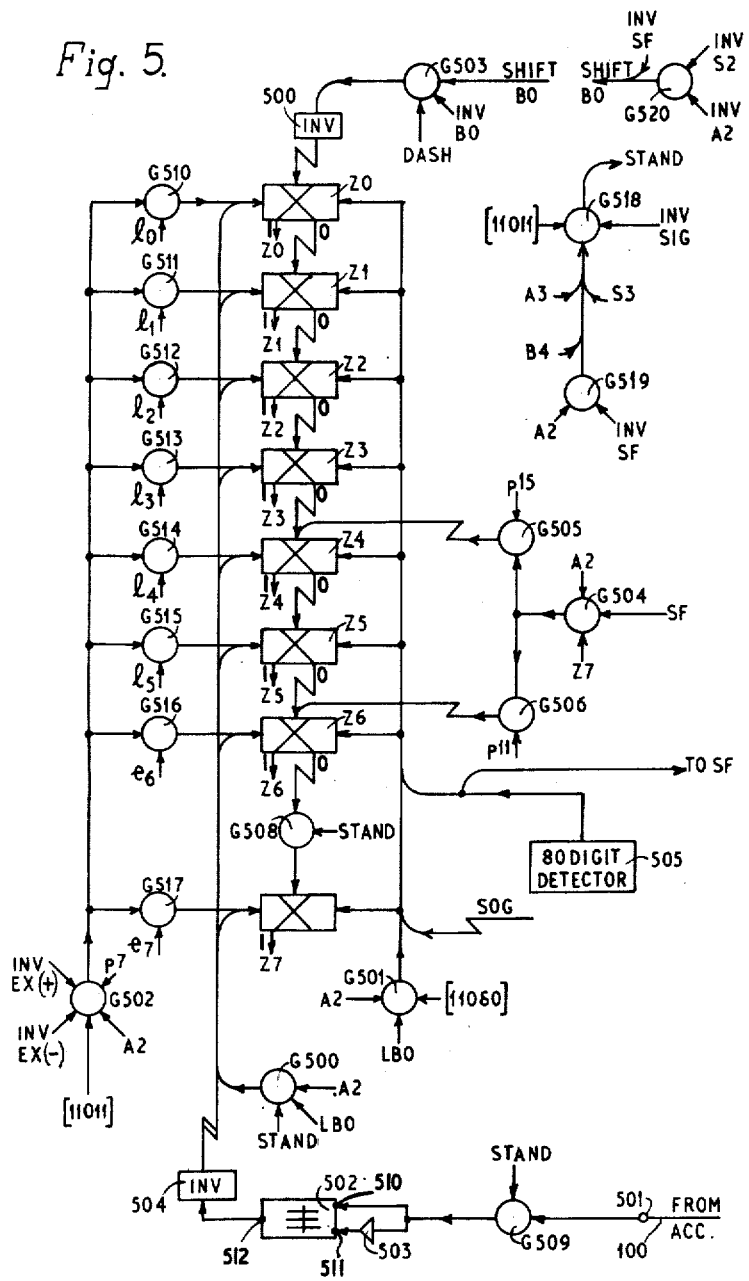
Fig. 5 is a similar more detailed block schematic diagram of the shift counters SC of Fig. 1.

Fig. 17 is a schematic circuit diagram of the 80 digit detector circuit 505 of Fig. 5.

Figure 1:
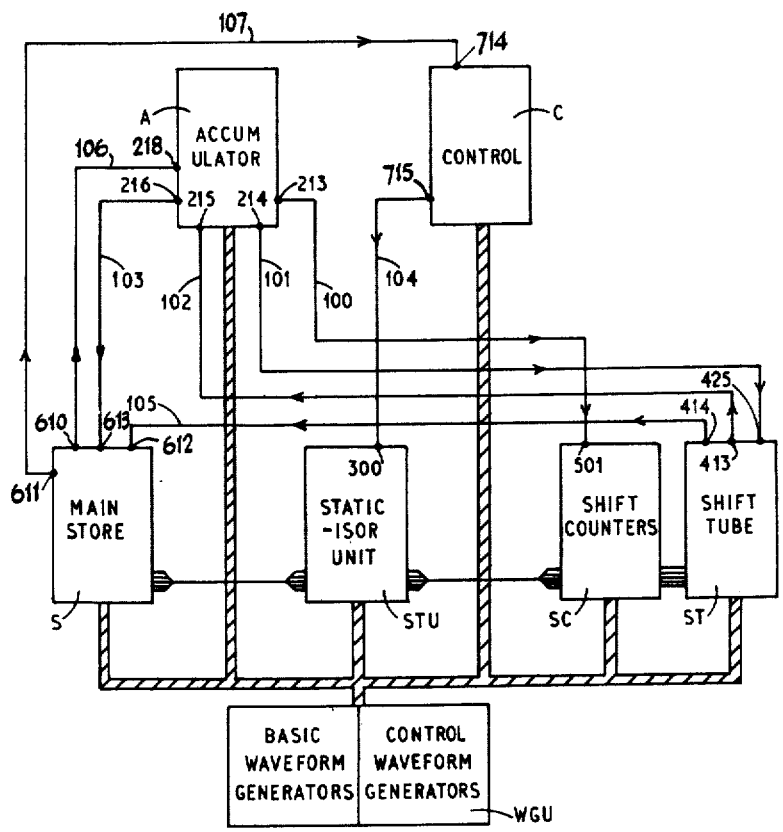
Fig. 1 is a block schematic diagram showing the arrangement of the principal elements of a computing machine such as that described in the aforesaid copending application and including the shifting arrangements according to the present invention.

The machine to which the present invention is shown applied is substantially similar to that described in detail in the aforesaid copending application and the principal elements thereof, insofar as they are concerned with the present invention, are shown in block schematic form in Fig. 1. Such elements include a main data store S (shown in greater detail in Fig. 6) for recording both number and instruction words, an accumulator A (shown in greater detail in Fig. 2) for performing chosen arithmetical and other operations, such as logical operations, with number words applied thereto, a control C (shown in greater detail in Fig. 7) for selecting and receiving chosen sequential instruction (P.I.) words forming the programme of instructions from the main store S and utilising such selected instruction words to control the operation of the machine during each of a succession of major cycles or bars of operation, a staticisor unit STU (shown in detail in Fig. 3) for converting a dynamic control (C.I.) word or instruction (P.I.) word into a series of sustained or static control potentials and a series of basic rhythm and other controlling waveform generators WGU (shown in detail in Figs. 8 and 9) for governing the timing and rhythmic operation of the machine as a whole. These various elements are, of course, interconnected with each other over a plurality of paths as in the aforesaid application.

In addition, for the purpose of the present invention, there is provided a shift counter SC (shown in detail in Fig. 5) and a shift storage tube ST (shown in detail in Fig. 4), these further elements being likewise interconnected with the other elements of the machine in order to carry out the present invention.

It will be understood that only those interconnections which are essentially concerned with a clear understanding of the present invention have been shown in Fig. 1 and that, for the sake of clarity, not all of the parts and not all of the interconnections which are present in the complete machine have been indicated either in Fig. 1 or in the more detailed Figs. 2–7.

As described in detail in the aforesaid copending application, the machine operates with the binary notation of numbers and in the serial mode with both number and instruction words expressed dynamically as electric pulse signal trains. Fig. 10j illustrates a typical form of instruction word, hereinafter referred to for brevity as a P.I. word, while Fig. 10k illustrates a typical number word and Fig. 10l a so-called control or C.I. word. It will be seen that both number and instruction words are identical in form although the significance of the various sequential pulses thereof is different.

The machine operates at a digit signalling speed of 100 kc./s., i.e. a 10 microseconds digit-interval time, with the binary digit value "1" indicated by a negative-going square pulse during the last 7 microseconds of any particular digit-interval. The binary digit value "0" is indicated by the absence of such a negative-going pulse during any particular digit-interval. Each number and P.I. or C.I. instruction word is of 20 digit-intervales length and these form the last 20 of a 24 digit-interval period known as a minor cycle or beat period. The normal operating rhythm of the machine is one of four of such minor cycle or beat periods, referred to respectively as the S1, A1, S2 and A2 beats, in each bar period which is the minimum time required in the performance of each operation involving the use of a particular P.I. word and the carrying out of the particular operation called for by that word. Such basic four beat-to-the-bar rhythm can, however, be extended as necessary to one of 5, 7 or even more beats in a bar under certain operating conditions in a manner analogous to that referred to in the aforesaid copending application.

As shown in Fig. 10 the 24 successive digit-intervals in each bar are referred to as the P20, P21, P22, P23, P0, P1 . . . P18 and P19 intervals. The first four digit-intervals P20 . . . P23, constitute a so-called blackout period during which the cathode ray tube beams of the various storage devices employed are executing their flyback movement while the remaining 20 digit-intervals P0 . . . P19 constitute the active pulse train signal period of each beat.

The respective digit-intervals P0, P1 . . . P19 of a number word represent respectively successively increasing binary power values such as, for instance, the binary value $2^0$ by digit-interval P0, $2^1$ by digit-interval P1 and so on. The number word shown in Fig. 10k accordingly represents the binary number 0000 . . . 01001011 or decimal value 75. Each P.I. word, as shown in Fig. 10j, comprises a first group of 6 digit-intervals P0 . . . P5, known as the 1 digits, for defining which line out of a total of 64 storage lines present in any storage tube of the main store S is required. The next four digit-intervals P6 . . . P9, known as e digits, define which storage tube out of 16 similar storage tubes in the main store S is required. The next four digit-intervals P11 . . . P14, known as b digits, are concerned with the so-called B-tube function and as this is in no way concerned with the present invention it will not be further referred to. The final five digit-intervals P15 . . . P19 form what are known as the f digits and control the function to be performed by the machine during any bar period.

In the accompanying drawings use has been made of a variety of block schematic symbols with a view to increasing the clarity of illustration.

The symbol as shown for each of the elements L0, L1 . . . L5 in Fig. 3 denotes a two-stable-state trigger circuit of wholly conventional form such as that shown in Ultra High Frequency Techniques by Brainerd et al. (1942) Van Nostrand, p. 174, Fig. 4–8 but with an additional triggering input to each valve anode as shown, for example, in M.I.T. Radiation Laboratory Series, vol. 19, (1949),McGraw-Hill, p. 164, Fig. 5–4. Such trigger circuits have two stable states which will be referred to respectively as the triggered or "on" state at which the left-hand output lead (1) at the bottom of the symbol is assumed to be at a negative potential and the opposite right-hand output lead (0) at the bottom of the symbol to be at a positive or earth potential and the reset or "off" state wherein the output lead potentials are reversed. The trigger circuit is triggered to the "on" state by a negative triggering pulse on the left-hand side input lead and is reset to the "off" state by a similar negative pulse on the right-hand side input lead. The further input to the centre of the top of the symbol is the state-reversing input through which any applied negative pulse serves to alter the state of the trigger circuit from whichever existing condition it is in the opposite condition.

Figure 2:
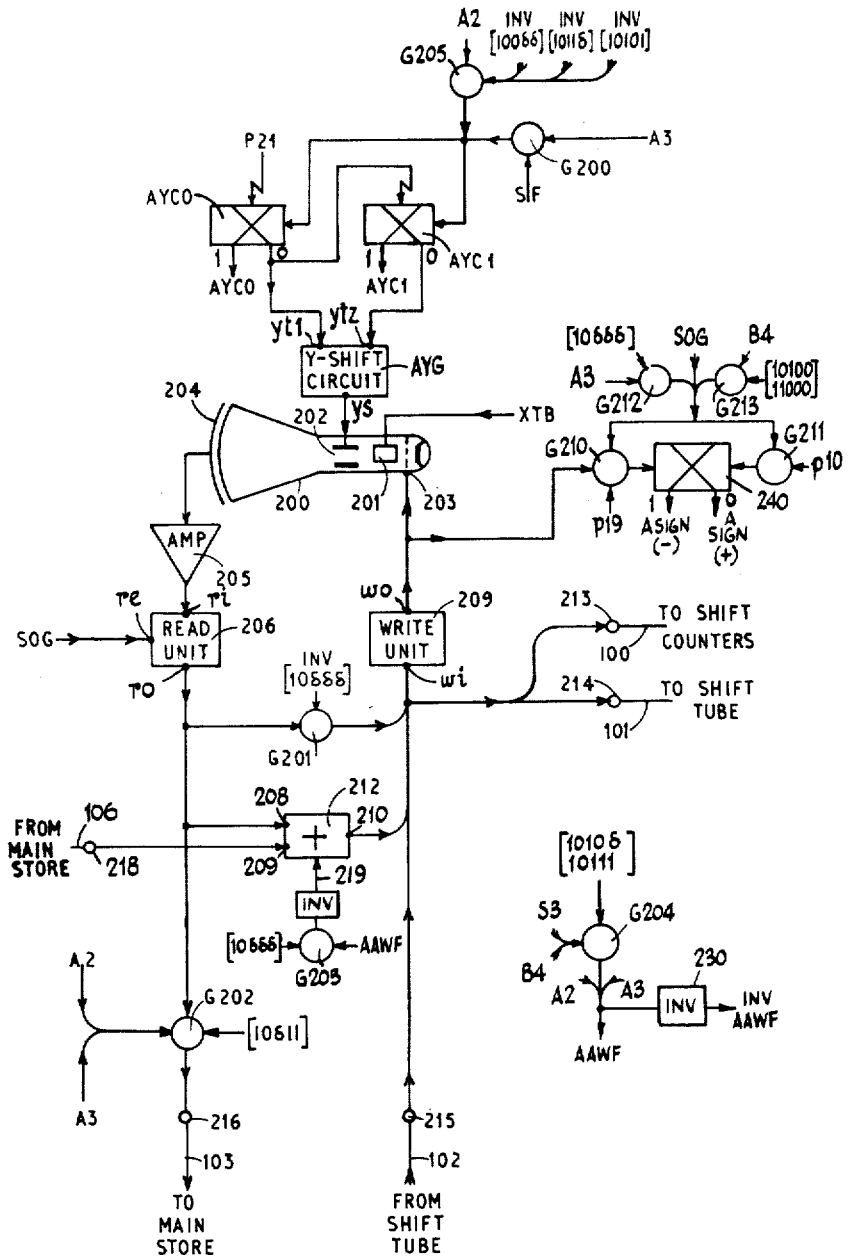
Fig. 2 is a more detailed block schematic diagram showing those elements of the accumulator A of Fig. 1 which are concerned with the invention.
Figure 3:
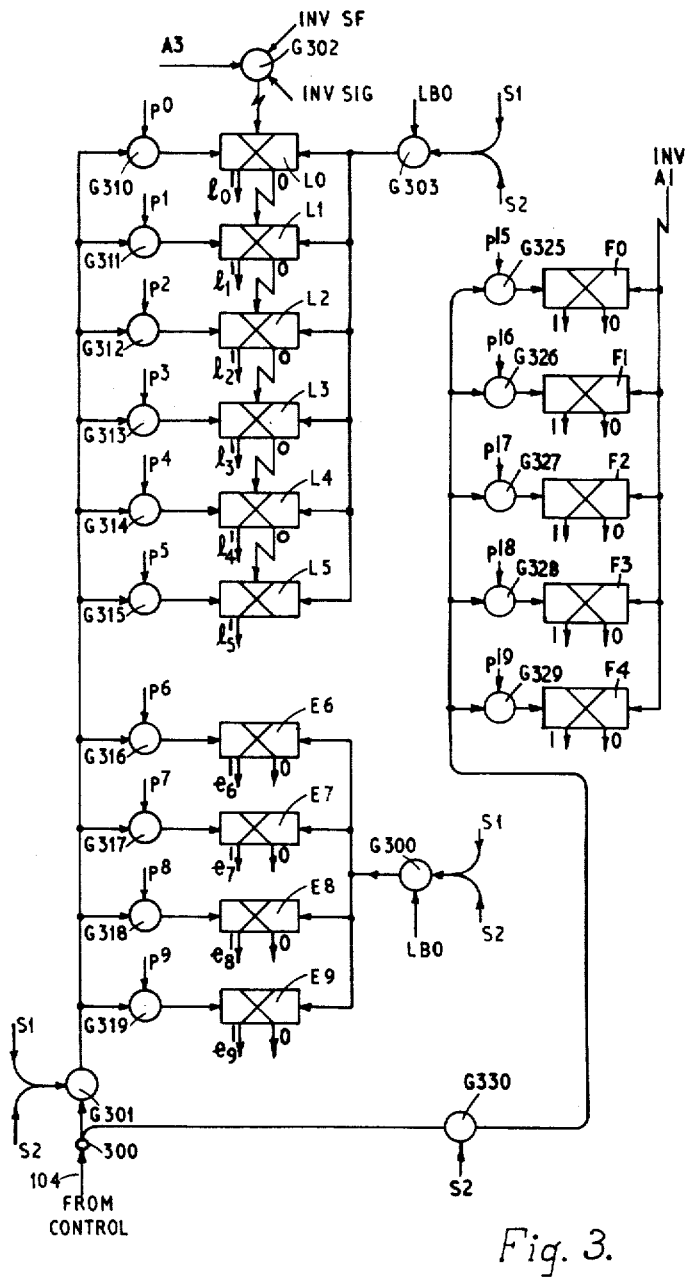
Fig. 3 is a similar more detailed block schematic diagram of certain elements of the staticisor unit STU of Fig. 1.

The symbol as shown at G302 in Fig. 3 indicates an "and" or coincidence gate circuit which requires simultaneous (normally negative polarity) gate opening potentials on all of the input leads directed towards the symbol to produce any output on the single output lead directed away from the symbol. Such gate circuits are conveniently of the multiple-diode type as described, for instance, by C. H. Page in "Electronics," September 1948, p. 112, Fig. 2(F). Such gate circuits may have any number of separate input leads indicated by the number of arrow heads leading to the symbol.

The symbol as shown by the merging conductors labelled S1 and S2 to gate G301 in Fig. 3 indicates an "or" or buffer circuit by which an input signal on any one of the convergent leads serves to provide an output signal on the single output lead without any return flow of the signal on any of the other input leads. Examples of such devices are also shown in the aforesaid reference of C. H. Page, Electronics, September 1948, p. 112 at Fig. 2(G).

Figure 7:
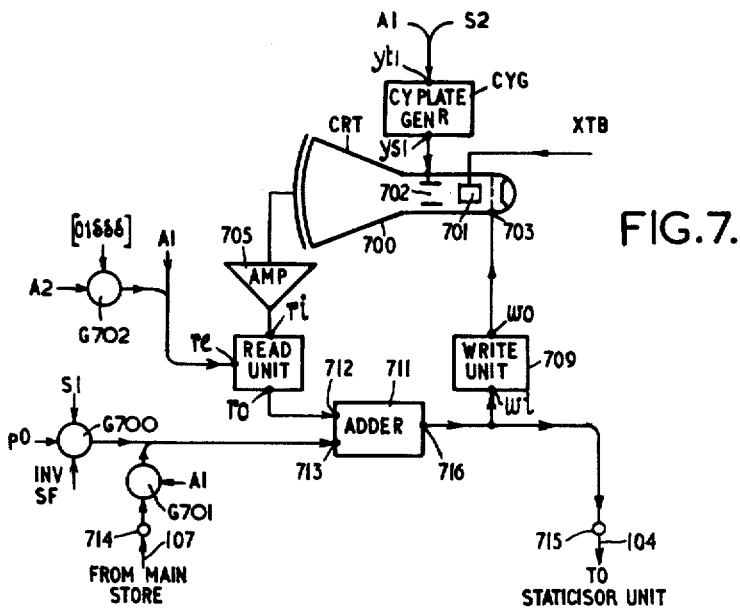
Fig. 7 is a similar more detailed block schematic diagram showing the arrangements of the control C of Fig. 1.

The symbol shown, for example, at 212 in Fig. 2 or at 711 in Fig. 7 constitutes a so-called adding circuit by which two simultaneously applied pulse signal trains on the separate left-hand input leads are combined to form a single output pulse train on the single right-hand output lead, which pulse train is representative of the binary sum number of the two binary numbers which were respectively represented by the two input pulse signal trains. An example of a suitable adding device is to be found in British Patent No. 693,424 or U.S. Patent No. 2,671,607. In the particular instance of the device 212 of Fig. 2 the circuit includes an additional gate circuit in its output connection by which it is rendered inoperative until a suitable gate opening potential is applied to the lead 219.

Figure 4:
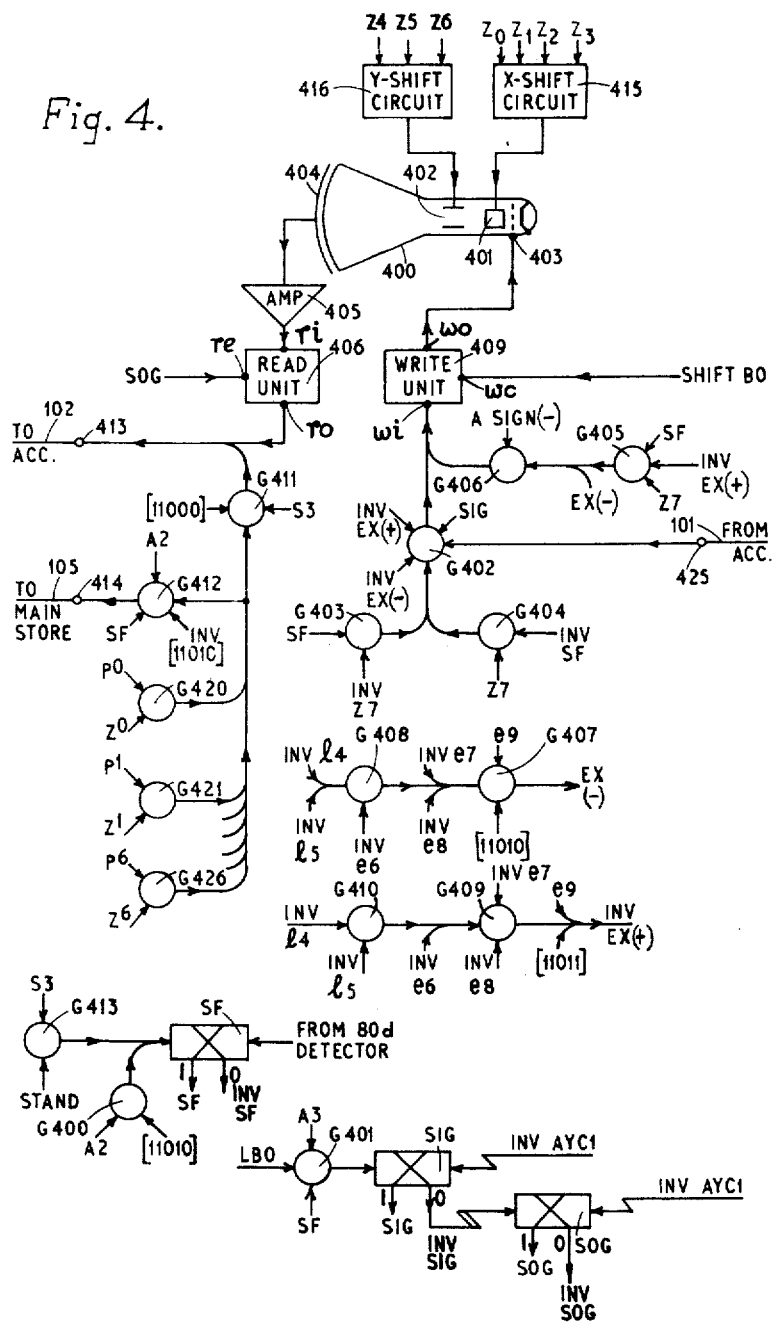
Fig. 4 is a similar more detailed block schematic diagram showing the arrangements of the shift tube SU of Fig. 1.

A zig-zag symbol included in any lead, such as that shown between the two trigger circuits L0 and L1 in Fig. 3 indicates the inclusion of a differentiating circuit whereby, for instance, a negative-going pulse signal is converted into a sharp negative spike coincident with the leading edge of the pulse and a similar sharp positive-going spike at the trailing end of such pulse. A symbol such as that shown between the right-hand "0" output lead of trigger circuit SIG and the left-hand or triggering input of trigger circuit SOG in Fig. 4 is of similar significance except that, by the slightly different form of zig-zag symbol used, it indicates that the circuit time constant is materially slower than that of the earlier type of differentiating circuit. Such differentiating networks are very well known and usually comprise a series capacitor and a leak resistance, to, say, earth as illustrated in M.I.T. Radiation Laboratory Series, vol. 21, (1948), McGraw-Hill, p. 64, Fig. 4–1.

The symbol shown, for example, at 500 and 504 in Fig. 5 indicates an inverter circuit consisting, usually, of a normal thermionic valve with the input to its control grid and the output from its anode whereby polarity inversion is obtained between the input signal and the output signal. Such devices are again extremely well known and one particular circuit arrangement is shown in Fig. 15 of the accompanying drawings in connection with valve V31.

The symbol shown at 502 in Fig. 5 constitutes a so-called "not equivalence" detecting circuit by which an output signal is obtained whenever two applied input pulse signal trains show a non-similarity of signal content in each of the corresponding and simultaneously occurring digit-intervals thereof. One example of such a not-equivalence circuit is shown in and described later with reference to Fig. 16.

The various input leads to gate circuits and the like are provided with legends which indicate the particular waveform or other control potential which is applied to that input. The various waveforms are illustrated in Figs. 10 and 11 and will be described later but the special legend comprising a group of five symbols within enclosing square brackets as shown, for example, at the right-hand input to gate G202 in Fig. 2, is indicative of a so-called "function code" signal derived upon the occurrence of a particular combination of digits for the $f$ group of digits of a P.I. signal as shown in Fig. 10$j$ at digit-interval positions P15 . . . P19. Thus the particular $f$ digit combination of a P.I. signal which will cause application of an opening potential on the right-hand input to gate G202 is that in which digit P15 is of value "1," digit P16 is of value "0," digit P18 is of value "1" and digit P19 is of value "1." The symbol "$\delta$" indicates that the particular digit (P17 in this instance) can be of either value "0" or "1." The gate G202 will accordingly be opened by either of the $f$ codes 10011 or 10111.

Such code signals are derived from arrangements of the type illustrated in Fig. 15 and which comprises a valve V30 whose control grid is connected to the common end of a group of five similar high value resistors R30 . . . R34 the opposite ends of which are respectively connected to terminals $f0$ . . . $f4$. Such terminals are connected to the appropriate output terminals ("0" or "1") of the trigger circuits F0 . . . F4 of the staticisor unit STU (Fig. 3) which deal with the aforesaid digits P15 . . . P19 of the P.I. word in a manner which will be described later. The said staticisor trigger circuits provide an output which is either positive-going (+50 v.) or negative-going (−10 v.) according to the setting state of the trigger circuit. With the circuit shown in Fig. 15 unless all of the five input terminals $f0, f1$ . . . $f4$ are taken to points of negative potential (−10 v.) the valve V30 is held turned on and its anode potential is low accordingly. When all five inputs are driven negative, however, the valve is cut off and its anode potential rises. The anode output from this valve V30 is then applied to a second inverter valve V31 whereby a negative-going output suitable for gate opening purposes is obtained at the anode of this second valve when all the applied inputs are negative-going and a positive output is obtained at all other times. The output from such second valve available at terminal $cso$ constitutes the aforesaid "function code" signal.

The symbol such as that shown at 200 in Fig. 2 indicates an electrostatic cathode ray storage tube while those indicated at 205, 206 and 209 denote the associated output amplifier, read unit and write unit respectively of such tube. Such storage devices are described in detail in the aforesaid literature reference by F. C. Williams and T. Kilburn in Proc. I.E.E., March 1949, but for convenience a typical circuit arrangement of the read and write units is shown in Fig. 12 and will be described later as will also the ancillary X-time base and Y-deflection waveform generators which are also associated with such storage devices.

*Basic and control waveform generation*

The normal operating rhythm of the machine is controlled by a series of repetitive waveforms including those which are shown in Figs. 10 and 11. In general such waveforms may be regarded as having a resting or inoperative level of about earth potential or above and an active or operative level which is appreciably negative to earth, say, −10 v. or more. Gate circulits and other devices suppied with a controlling waveform may, unless otherwise stated, be regarded as operative, i.e. open in the case of the gate circuit, if the control potentials are at the negative level and inoperative, i.e. closed in the case of the gate circuit, if the control potential is at earth level or above.

Figure 8:
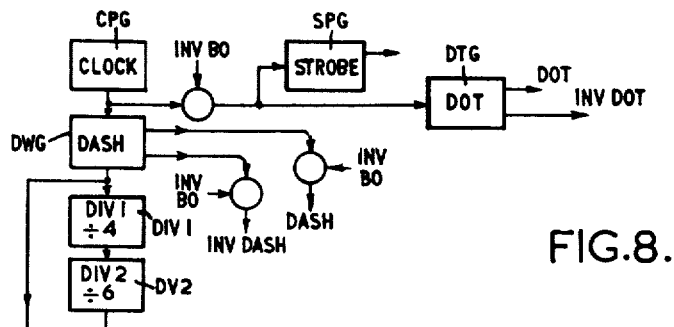

Referring now to Fig. 8, the basic rhythm of the machine is determined by a master or clock oscillator CPG comprising a stable frequency thermionic valve oscillator of wholly conventional form operating at 100 kc./s. The output from this clock oscillator provides a triggering medium direct to mono-stable multivibrator circuit DWG and through gate G800 for two further mono-stable multivibrator circuits SPG and DTG. These three M/V circuits are each of conventional form, such as that shown in M.I.T. Radiation Laboratory Series, vol. 19, (1949), McGraw-Hill, p. 168, Fig. 5–10, and serve to provide, for each triggering input pulse, both negative- and positive-going output pulses of a time duration predetermined by the time constants of the circuit. The negative pulse output from trigger circuit DWG (shown in Fig. 10$a$), fed through gate G801 provides the DASH waveform shown in Fig. 10$b$ consisting of a negative-going pulse during the last 7 microseconds of each 10 microsecond digit-interval as defined by the clock oscillator CPG except during the digit-intervals P20 . . . P23 of the blackout pulse period. The inverse polarity or positive-going output of the same generator, fed through gate G802, forms the INV DASH waveform. The trigger circuit DTG similarly provides the DOT and INV DOT waveforms shown in Fig. 10$c$ consisting of a shorter pulse of some 2 microseconds duration during the fourth and fifth microsecond portions of each of the digit-intervals P0 . . . P19. The trigger circuit SPG likewise provides a positive-going short pulse of about ½ microsecond duration from a negative level of say −20 v. at a time which is a little delayed after the leading edges of the related DOT and DASH waveform pulses. This STROBE waveform is shown in Fig. 10$d$. Such DASH, DOT and STROBE waveforms are utilised in the cathode ray storage tubes in a manner exactly analogous to that described in the aforesaid literature reference of F. C. Williams and T. Kilburn, Proc. I.E.E., March 1949.

As already stated each beat interval is of 24 digit-intervals length and the various individual digit-intervals are separately defined by a series of so-called p-pulses of which a selection is shown in Figs. 10$g$, 10$h$ and 10$i$. These p-pulse waveforms are generated in the circuit PPG, Fig. 8, which is of the form as described in detail in British Patent No. 705,477 and U.S. Patent No. 2,683,802. Briefly the arrangement comprises a group of 24 combined trigger circuit/gate devices PP20 . . . PP23, P0 . . . P19 in which each gate is opened while the associated trigger circuit is on and is closed at all other times, the various trigger circuits themselves being connected in the manner of a ring counter so that as one is turned on it turns off the preceding circuit, each trigger except the first being turned on by the trailing edge of the issuing p-pulse waveform from the preceding trigger circuit. The triggering pulse for the first circuit PP20 is derived from generator DWG through two pulse counter circuits DV1 and DV2 of the phantastron type dividing respectively by ratios of 4 and 6 whereby every 24th pulse from circuit DWG constitutes an initiating trigger for such first circuit PP20. All of the trigger circuits are supplied in parallel with the pulse output from generator DWG so that when the first circuit PP20 is turned on the coincident DASH-type pulse of digit-interval P20 is allowed to pass therethrough to form the p20-pulse waveform and thereafter the next circuit PP21 is turned on to allow the gate circuit associated therewith to pass the next DASH-type pulse thereby forming the p21-pulse waveform and so on.

To define the blackout period during which the beams of the cathode ray tube stores execute their flyback movement there is provided the B0 waveform shown in Fig. 10e comprising a negative-going pulse during the digit-intervals P20 . . . P23 of each beat. This waveform is generated by trigger circuit B0WG whose riggering input is supplied, through inverter stage 802, with the p19-pulse waveform and whose resetting input is supplied, through inverter 801, with the p23-pulse waveform. Use is also made in this machine for the purpose of the present invention of the so-called LB0 waveform of Fig. 10f comprising a negative-going pulse during the digit-intervals P21 . . . P23 of each beat. This waveform is generated by trigger circuit LB0G whose triggering input is supplied, through inverter 800, with the p20-pulse waveform and whose reset terminal is supplied with the p23-pulse waveform through inverter 801. As with all other waveforms in the machine, reversed polarity or inverse versions of such B0 and LB0 waveforms are made available as the INV B0 and INV LB0 waveforms.

The beginning of each operation bar period is marked by the release of a so-called Prepulse or starting signal comprising a sharp negative-going pulse. The form of this signal under normal machine operating conditions is shown in Fig. 11a. Each of the successive beats of a normal 4, 5 or 7 beat bar is separately defined by a related square pulse lasting for the duration of that particular beat. Thus Fig. 11b shows the S1 waveform for defining the S1 beat of a bar, Fig. 11c the A1 waveform defining the A1 beat of a bar and Fig. 11d the B4 waveform defining the B4 beat of a bar. Similar waveforms known as the S2, A2, A3 and S3 waveforms define the other, S2, A2, A3 and S3, beats of any bar.

The arrangements for generating such Prepulse and S1 . . . B4 waveforms are shown in Fig. 9 and comprise gates G900, G901 and G902 with trigger circuits 901, 902 . . . 908. Such arrangements operate as follows. Gate G900 can, initially, be assumed open upon closure of switch S900 to allow passage of the next occurring p1-pulse to trigger the trigger circuit 901 which thereupon opens gate G901 to allow the negative-going leading edge of the next following B0 pulse (at the extreme end of the same beat) to pass to Prepulse supply busbar 916. Immediately thereafter trigger circuit 901 is reset by the p0-pulse to close gate G901 and inhibit any further Prepulses since gate G900 is now closed for at least the next three beats by the INV S1, INV A1 and INV S2 waveforms.

The emitted Prepulse triggers the trigger circuit 902 to its on state which persists until the time of the leading edge of the next following B0 pulse which causes its resetting at the end of the first beat following the Prepulse. The "1" output of this trigger circuit accordingly provides the S1 waveform (Fig. 11b) and the "0" output of the circuit, the INV S1 waveform. Resetting of trigger circuit 902 provides a negative triggering pulse to the next trigger circuit 902 which accordingly is triggered on at the beginning of the second (A1) beat and remains so until the next available B0 pulse which resets it at the end of the beat. This trigger circuit accordingly provides the A1 waveform of Fig. 11c and the INV A1 waveform. By a similar action at the end of the second or A1 beat the resetting of trigger circuit 903 causes triggering of the third trigger circuit 904 during the third or S2 beat to effect generation of the S2 and INV S2 waveforms. Resetting of trigger circuit 904 by the B0 pulse at the end of the S2 beat causes triggering of the fourth trigger circuit 905 to effect generation of the A2 and INV A2 waveforms, such trigger circuit being reset at the end of the fourth or A2 beat by the B0 pulse. If the P.I. word active in control C during this 4-beat period is one calling for 5 or 7 beat (or more) operation it will have a "1" digit in the P15 position (Fig. 11j) and gate G902 is accordingly opened by the related function code signal so that retriggering of trigger circuit 905 at the end of beat A2 causes triggering of trigger circuit 906 to generate the A3 and INV A3 waveforms during the fifth beat A3 and the subsequent resetting of trigger circuit 906 by the B0 pulse at the end of this beat causes triggering of the sixth trigger circuit 907 to generate the S3 and INV S3 waveforms during beat S3 while at the end of this beat the resetting of trigger circuit 907 by the B0 pulse causes triggering of the seventh trigger circuit 908 to generate the B4 and INV B4 waveforms, the trigger circuit being reset at the end of the beat by the B0 waveform. The B4 waveform is shown in Fig. 11d while the nature of the other non-illustrated beat-defining waveforms will be obvious.

Immediately the INV S1, INV A1, INV S2 waveforms become available gate G900 will be closed during each of the beats S1, A1 and S2 to inhibit the p1-pulses of those beats from passing and in consequence trigger circuit 901 will remain reset. If the P.I. word is one which does not call for 5 or 7 beat operation then the function code signal (10000) will not be available and the signal from inverter 900 will be continuously negative and gate G900 will open during beat A2 in spite of the applied INV A2 waveform so that the p1-pulse of that beat (A2) passes the gate and triggers the trigger circuit 901 to allow the leading edge of the next B0 pulse (in the fifth beat following the previous Prepulse) to pass gate G901 and so provide a new Prepulse signal. Under these conditions gate G902 will remain closed and the A3, S3 and B4 waveforms will not be generated. If, however, the P.I. word signalled a requirement for 5 or 7 beat operation then the appropriate (negative) code signal will be applied to inverter 900 and the inverter output to gate G900 will be positive and gate G900 will remain closed to inhibit the passage of the p1-pulse in beat A2. At the same time gate G902 will be opened and the A3 waveform will be generated followed by the S3 and B4 waveforms. The gate G900 normally becomes opened during beat A3 (waveform INV SIG is normally continuously negative) and the p1-pulse of that beat passes therethrough to trigger the trigger circuit 901 and thereby to cause the initiation of a further Prepulse at the end of beat A3. The remaining beats S3 and B4 of the bar then overlap respectively beats S1 and A1 of the next following bar in known manner.

For the purpose of controlling the systematic regeneration in each of the cathode ray storage tubes use is made, in well known manner, of a series of so-called counter waveforms C0, C1, C2, C3, C4 and C5 of which representative examples are shown in Figs. 11e and 11f. Briefly, the C0 waveform changes sign at the beginning of any beat except an A1, A2 or A3 beat and the remaining counter waveforms are of respectively half the frequency of the immediately preceding waveform of the series, the C1 waveform being half the frequency of C0, the C2 waveform half the frequency of C1 and so on. The arrangements for generating such waveform are shown in Fig. 9 as gate G903 and trigger circuits 909 . . . 914.

A further waveform, referred to as SAWF, with its inverse version INV SAWF is used for controlling the write units of the cathode ray storage tubes of the main store S. These waveforms are generated by the arrangements comprising gate G90 and inverter 915 of Fig. 9. The SAWF waveform is shown in Fig. 11g.

Cathode ray tube storage device

The form of the various cathode ray storage tubes used in the machine is in accordance with that described in the aforesaid literature reference of F. C. Williams and T. Kilburn in Proc. I.E.E., March 1949 but for ease of reference and in explanation of the various signal connections to the block schematic form in which such storage tube devices are shown in Figs. 2, 4, 6 and 7, one complete storage tube arrangement has been shown in Fig. 12.

In this figure, the storage tube $t$ having beam control electrode $be$, X beam deflector plates $xp$ and Y beam deflector plates $yp$, has its associated signal pick-up plate $sp$ connected to amplifier $a$. The output terminal of the amplifier is connected to the input terminal $ri$ of read unit RU comprising valves V1, V2 and associated diodes D1 . . . D5 arranged and operating exactly as in the aforesaid reference. The read output from the read unit is available at read output terminal $ro$ and will be representative of the stored signal in tube $t$ provided the erase control potential applied to erase terminal $re$ is at earth level or above. If such erase control potential is negative, then the read unit is blocked and no output pulse signal train is available.

The beam control electrode $be$ is supplied from the write output terminal $wo$ of write unit WU which comprises valves V3, V4 and associated diodes D6, D7, again arranged and operating exactly as in the aforesaid reference paper. The controlling input to write unit WU is to write input terminal $wi$ and, as in the aforesaid reference, the output at terminal $wo$ will comprise a series of DOT pulses (Fig. 10c) whenever the input at terminal $wi$ is at earth potential but such DOT pulses will be extended to form DASH pulses (Fig. 10b) whenever a coincident DASH pulse is applied to terminal $wi$.

Control of operation of the write unit WU (and hence of the storage tube) is by means of so-called "blackout" valve V5 which, if conductive, causes depression of the potential of control grid of valve V4 to a negative level. Valve V5 has its suppressor grid connected to control terminal $wc$ for application of a control waveform such as the SAWF waveform (Fig. 11g) while the control grid of the valve is connected by way of individual resistors R to code input terminals $we$. The latter are used only in the case of the main store S when selection of one tube out of a number of tubes is required and in which case they are connected, each with a different code combination, to the staticisor sections of staticisor unit STU which deal with the $e$ digts of a P.I. word (Fig 10j).

In the operation of such valve V5, if the valve is held cut-off, either by negative potential at terminal $wc$ or negative potentials at all of the terminals $we$ simultaneously, the write unit WU and the associated storage tube is operative. If the valve V5 is conductive, the write unit and the associated tube is inoperative. In those cases where selective control of a number of tubes is not required terminals $we$ are permanently connected to earth and tube control effected through terminal $wc$. If no control at all is required, i.e. the tube is always operative then terminal $wc$ is permanently connected to a suitable negative potential.

The X deflection plates $xp$ are supplied (in push-pull) with a suitable line-scanning deflection voltage, e.g. a normal sawtooth waveform while the Y deflection plates $yp$ are normally supplied with a suitable stepped deflection voltage for positioning the tube beam, while executing its X scanning motion, on any chosen one of the different storage lines of the tube screen.

The line scanning motion of the beams of the various cathode ray tube stores (except that of shift tube 400, Fig. 4) is produced by the XTB waveform having the form shown in Figs. 10m and 11h and generated by a conventional type circuit such as that shown in Fig. 13 where valve V10 is arranged in a Miller feedback type of circuit through the intermediary of the cathode follower valve V11 and the coupling capacitor C10 in conjunction with resistor R10 and diodes D10, D11 and D12. The operation of this circuit follows the well known form and will not be further described. It provides a sawtooth waveform of the type shown in Figs. 10m and 11h having a linear sweep portion during the digit-intervals P0 . . . P19 of each beat and of an amplitude sufficient to move the beam along the length of a line containing 20 successive digit storage positions. The flyback portion of the XTB waveform takes place during the blackout period of digit-intervals P20 . . . P23. Such normal straightforward XTB waveform is used exactly as shown in the storage tube of the accumulator A and elsewhere in the machine and is available through cathode follower valve V12 at terminal $xa$. As, however, the storage tubes of the main store S are arranged each to store 64 20-digit words in two side-by-side columns each comprising 32 parallel lines, provision is made for imposing, under the control of the $l$ digit P5 of a P.I. word, an additional step or lateral shift on such XTB waveform to select one column or the other. This column shift is effected with the aid of a further valve V13 shown in Fig. 13 which comprises a cathode follower stage with a split cathode load of resistors R11, R12 and having its control grid fed from the cathode output point of valve V11. The tapping point between resistors R11, R12 is connected to the anode of one diode of a double diode gate comprising diodes D13 and D14, the two diode cathodes being interconnected and joined to the resistance R13 connected to a negative source of potential −150 v. The anode of the second diode D13 is connected through terminal $cs$ to the "1" output of the staticisor section L5 of unit STU (Fig. 3) dealing with the $l$ digit P5 so as to be driven negative when such $l$ digit is value "1." When this value is signalled in a P.I. word the gate is opened and the resistance R13 is placed in parallel with the portion R11 of the cathode load resistor of valve V13 thereby altering the potential level across the load resistor with consequent change of the lateral position at which the tube beam executes its X scanning motion by virtue of the XTB waveform which is derived from the same tapping point through terminal $xs$.

The arrangements for effecting Y-deflection of the tube beam within each of the various storage tubes are basically similar to those described in the aforesaid literature reference by F. C. Williams and T. Kilburn in Proc. I.E.E., March 1949 and are shown for ease of reference in Fig. 14. The arrangements of this figure are simplified as compared with those of the aforesaid literature reference and comprise a Y-shift valve V20 whose fluctuating anode potential forms one version of the Y-shift waveform, the opposite push-pull version of such waveform being derived from a paraphase amplifier $ppa$. The Y-plate waveforms are available at terminals $ys1$ and $ys2$.

The circuit operates in a manner identical with that of the aforesaid literature reference description by selective control of the amount of bleed current drawn through diodes D20, D21 . . . D24 from the control grid of the Y-shift valve V20 by switching on or off the appropriate combination in a group of five further valves V21, V22 . . . V25 whose cathode circuits contain resistors R20, R21 . . . R24 of graduated value, that of R20 being twice the value of R21, R21 being twice the value of R22 and so on. Each of the said control valves V21 . . . V25 has its control grid connected to a related control input terminal $yt1$, $yt2$, $yt3$, $yt4$ and $yt5$. According to the combination of control valves made conductive or nonconductive so a total of 25 or 32 voltage steps are made available in the Y-deflection waveform output at terminals *ys*1, *ys*2.

This same type of circuit is used for other instances of Y-shift voltage generation by appropriate variation of the number of the control valves V21 . . . V25 as will be referred to later. It will be clear that while, with five valves as shown, a total of 32 different voltage steps may be provided corresponding to the 32 separate parallel storage lines, when only two of such control valves a total of four steps will be made available.

Main store S

Figure 6:
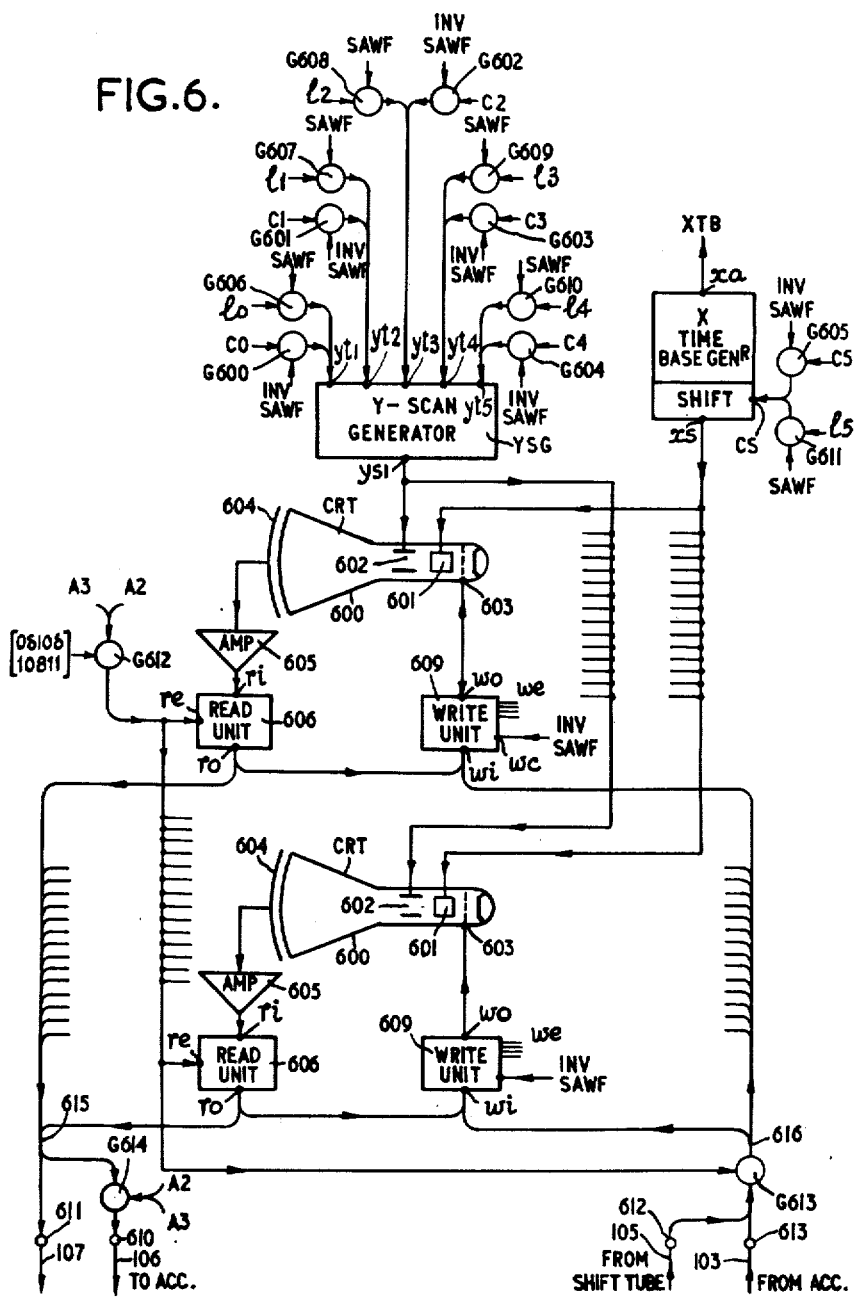
Fig. 6 is a similar more detailed block schematic diagram showing the arrangements of the main store S of Fig. 1.

The main store S, insofar as it is concerned with the present invention, is shown in Fig. 6 and comprises a group of 16 storage tubes 600 of which only two are shown. Each storage tube has X-beam deflection plates 601, Y-beam deflecting plates 602 and beam control electrode 603 together with signal pick-up plate 604 which feeds output signals to amplifier 605 in the known manner. The output from each amplifier is connected to the input terminal *ri* of the associated read unit 606 (see Fig. 12) while the beam control electrode 603 of each tube is connected to the output terminal *wo* of the associated write unit 609. The read output terminal *ro* of each read unit is directly interconnected with the write input terminal *wi* of the associated write unit 609 to form a closed regenerative loop while, in addition, all of the read output terminals *ro* of the various read units 606 are connected via buffer means to a common output busbar 615 which feeds output signals from the store to lead 107 via terminal 611 and to lead 106 via gate G614 and terminal 610. An input busbar 616 which receives input signals via gate G613 from either lead 105 and terminal 612 or lead 103 and terminal 613 is separately connected by way of suitable buffer circuits to the write input terminals *wi* of each of the write units 609.

The erase control terminals *re* of each of the read units 606 are connected in parallel to the output from gate G612 while the write control terminals *wc* of each of the write units 609 are supplied with the INV SAWF waveform (reverse version of Fig. 11g). The tube selection control terminals *we* of each write unit are connected each with a different combination, to the tube selection or *e* digit staticisor sections E6 . . . E9 of the staticisor unit STU (Fig. 3).

Each of the X-deflection plates 601 are connected in parallel to the output terminal *xs* (see Fig. 13) of the X time base generator XTB which is of the form already described with reference to Fig. 13 and includes the column shift arrangements also referred to, the input to the shift control terminal *cs* of which is derived from gates G605 and G611. The Y-deflection plates 602 of each of the tubes are likewise connected in parallel and fed from terminals *ys*1 and *ys*2 (only *ys*1 is shown) of a Y-scan generator YSG of the form already described in connection with Fig. 14. The controlling inputs to the five control terminals *yt*1, *yt*2, *yt*3, *yt*4 and *yt*5 of such Y-scan generator are derived respectively from pairs of gates G600 and G606, G601 and G607, G602 and G608, G603 and G609, G604 and G610.

Control C

The arrangements of the control C, insofar as they are concerned with the present invention, are shown in Fig. 7 and comprise a single cathode ray storage tube 700 with its X-deflection plates 701, Y-deflection plates 702, beam control electrode 703 and signal pick-up plate 704 which supplies signals to amplifier 705. The amplifier output is applied to the input terminal *ri* of read unit 706 while the output terminal *wo* of write unit 709 supplies controlling signals to the beam control electrode 703.

The output terminal *ro* of read unit 706 is connected to one input terminal 712 of an adding circuit 711. The second input terminal 713 of such adding circuit is supplied by way of lead 107, terminal 714 and gate G701 from the main store S and is also supplied with the *p*0-pulse waveform by way of gate G700. The read unit erase control terminal *re* is supplied with the A1 waveform and from gate G702. The output terminal 716 of adding circuit 711 is connected to the write unit input terminal *wi* and also by way of terminal 715 and lead 104 to the staticisor unit STU.

The X-deflection electrodes 701 are supplied with the XTB waveform output from terminal *xa* of generator XTB (Fig. 6), i.e. without superimposed column shift. The Y-deflection plates 702 of the tube 700 are supplied with a deflection waveform providing only two alternative levels and derived from terminal *ys*1 of generator circuit CYG which resembles that shown in Fig. 14 except that it has only one control valve which is governed by the controlled input at terminal *yt*1 comprising the buffer gate combination of the A1 and S2 waveforms.

Accumulator A

The arrangements of the accumulator A are shown in Fig. 2 and comprise a further cathode ray storage tube 200 with its beam control electrode 203, X-deflection plates 201, Y-deflection plates 202 and signal pick-up plate 204 together with the associated elements including amplifier 205, read unit 206 and write unit 209. The interconnection between the output terminal *ro* of read unit 206 and input terminal *wi* of write unit 209 is by way of a number of alternative paths including one via gate G201 and another by way of first input terminal 208 of an adding circuit 212 the second input terminal 209 of which is supplied via terminal 218 and lead 106 from the main store S. This adding circuit is normally operative but can be rendered inoperative by an appropriate input from gate G203 on lead 219 to an included gate means.

The output terminal *ro* of read unit 206 is also connected through gate G202 and terminal 216 to lead 103 to the main store S while the outputs from the gate G210 and output terminal 210 of adding circuit 212 are applied to the input terminal *wi* of write unit 209 and are also made available as an output through terminal 213 and lead 100 to the shift counter unit SC and by way of terminal 214 and lead 101 to the shift tube ST. An input from lead 102 from the shift tube ST is connected through terminal 215 direct to the write unit input terminal *wi*.

The X-deflection plates 201 are supplied with the XTB waveform from terminal *xa* of generator XTB, Fig. 6, while the Y-deflection plates 202 are supplied from a Y-shift generator circuit AYG which is of a form similar to that shown in Fig. 14 but having only two control valves for providing four alternative line scanning levels. The controlling inputs at terminals *yt*1 and *yt*2 for such control valves are provided by the "0" terminal outputs from trigger circuits AYC0 and AYC1 as shown. The erase control input to terminal *re* of read unit 206 comprises the SOG waveform.

The AAWF waveform used for control of gate G203 is derived from the arrangement including gate G204 and the inverse version INV AAWF through inverter 230.

Staticisor unit STU

The arrangements of the staticisor unit STU are shown in Fig. 3 and comprise a first group of trigger circuits L0, L1 . . . L5 for dealing with the six *l* digits of a C.I. or P.I. word (Fig. 10*l*, Fig. 10*j*), a second set of four trigger circuits E6 . . . E9 for dealing with the *e* digits of such C.I. or P.I. words and a further group of five trigger circuits F0, F1 . . . F4 for dealing with the *f* or function digits P15 . . . P19 of a P.I. word. The input to the staticisor units over lead 104 from the control C is supplied to input terminal 300 and thence to each of the trigger circuits L0 . . . L5 and E6 . . . E9 by way of gate G301 and by way of gate G330 to the trigger circuits F0 . . . F4.

The trigger circuits L0 . . . L5 are connected as a counter chain for stepping-on by a pulse input to circuit L0 from gate G302.

*Normal machine operation*

The normal operation of the machine will first be described since an understanding of the special arrangements according to the present invention is dependent thereon. This normal operation is identical with that described in detail in the aforesaid copending application and is briefly as follows. It will be assumed that the main store S has, in one of the storage tubes (tube O), each of the sequential instructions of a programme of instructions located therein in order on sequential address lines, that is to say, instruction 1 in line 1, instruction 2 in line 2 and so on. It will also be assumed that the various number words which are required to be handled by the instructions are stored in another tube at various known locations.

Upon release of a Prepulse signal (Fig. 11a) by closure of switch S900, Fig. 9, gate G900 is opened as all of the other controlling waveforms except $p1$ are then negative. The next $p1$-pulse accordingly passes and triggers the trigger circuit 901 which thereupon opens gate G901 and allows the next B0 pulse to pass to the pre-pulse busbar 916 and so commence the major cycle or bar period. Control tube 700 (Fig. 7) is scanning one, the C.I., line of its two storage lines and it will be assumed that this line is blank. There will accordingly be no number output from read unit 706 but a $p0$-pulse (value "1") passed through gate G700 to input terminal 713 of adder 711 has the effect of putting a pulse representing numeral 1 back into the C.I. line of the storage tube 700 in the digit position P0. This same C.I. number 000 . . . 00001 is passed to output terminal 715 and thence via lead 104 to the staticisor unit STU (Fig. 3). Gate G301 is open by applied S1 waveform and the aforesaid C.I. number train passes to the common input lead to the groups of trigger circuits L0 . . . L5 and E6 . . . E9. Each of the gates G310, G311 . . . G319 are opened in turn during the times of the different digit-intervals P0, P1 . . . P9 so that the pulse content of the respective digit-intervals are selectively routed to the triggering inputs of the different trigger circuits. In the example given only trigger circuit L0 will be triggered and in consequence the potential of the left-hand or "1" output terminal of that trigger circuit will move negative and its right-hand or "0" output will move positive, the right-hand or "0" outputs of the remaining trigger circuits maintaining their previous negative level and the left-hand or "1" outputs of such circuits maintaining their previous positive level. These staticisor outputs are available at various parts of the machine by interconnecting means which are not shown since the "1" output thereof is indicated in each case by the related caption $l0, l1 \ldots e9$.

During this same beat S1 each of the tubes 600 of the main store S (Fig. 6) are regenerating on one of the 64 storage lines determined by the particular form of the counter waveforms C0 . . . C4 existing at that time and which are applied through gates G600 . . . G604 respectively to the Y-scan generator YSG and by the counter waveform C5 acting through gate G605 on the shift control terminal $cs$ of the XTB generator. The INV SAWF waveform (reverse of Fig. 11g) is negative during this S1 beat.

In the next following beat A1 the reversal of the SAWF and INV SAWF waveforms makes the setting configuration of the outputs $e6, e7, e8$ and $e9$ from staticisor trigger circuits E6 . . . E9 which are applied to terminals $we$ of the write units 609 of the main store S effective whereby one tube only (tube O since all $e$ digits are of value 0) is made active, the others being blacked out. At the same time the setting of the staticisor trigger circuits L0 . . . L5 becomes effective upon the Y-scan generator YSG through the series of gates G606 . . . G610 opened by the SAWF waveform to select the particular line, i.e. line 1, in the said tube O of the main store whereby the P.I. word located in that line is read out through output terminal $ro$ of read unit 606 for regeneration and also by lead 107 to the control input terminal 714 (Fig. 7). During this same A1 beat, the cathode ray storage tube 700 of the control is scanning on its second or P.I. line by reason of the action of the A1 waveform input to the Y-plate generator CYG. The read unit 706 is at this time blocked by application of the A1 waveform (Fig. 11c) to erase input terminal $re$ whereby any previous number stored on this P.I. line is erased and the only input to the adding circuit 711 and write input terminal $wi$ of the write unit 709 is that of the new P.I. word arriving from the main store at the input terminal 714 and passing by way of now-open gate G701 to terminal 713 of the adder 711. This P.I. word is accordingly written on the P.I. storage line of the control tube 700. No output passes by way of terminal 715 and lead 104 as gate G301 of staticisor unit STU (Fig. 3) is now closed.

In the next following beat S2 the SAWF waveform again changes and with it the C0 and possibly other counter waveforms also whereby control of the scanning line selection in the main store S (Fig. 6) reverts to the counter waveforms C0 . . . C5 by reopening of gates G600 . . . G605. All of the tubes are now operative again to effect individual regeneration of their stored contents of the selected regeneration line.

During the same beat the control tube 700 (Fig. 7) continues to operate on its second or P.I. storage line by reason of the application of the S2 waveform to terminal $yt1$ of the waveform generator CYG. The P.I. word inserted during the previous beat A1 on this line is accordingly read out again through read unit 706 (now operative) to the first input terminal 712 of adding circuit 711. No input is available at the second input terminal 713 of the adding circuit as any output from the main store S is blocked at gate G701 while gate G700 is also closed. The output at terminal 716 is accordingly the unchanged P.I. word and this is then fed to write unit 709 for regeneration within the storage tube 700 and is also passed by way of terminal 715 and lead 104 to the staticisor unit STU (Fig. 3).

For the purpose of explanation it will be assumed that the P.I. word read from the main store during beat A2 was one which called for the transfer of a number in line 35 of tube 4 to the least significant storage line of the accumulator A. The aforesaid word configuration will be 101000000000100100011 (reading from right to left).

The first six or 1 digits 100011 are respectively selected by gates G310 . . . G315 for operation of the trigger circuits L0 . . . L5 to set these up so that trigger circuits L0, L1 and L5 are turned on to provide negative outputs at their "1" terminals and the trigger circuits L2, L3 and L4 remain turned off to provide positive outputs at their "1" terminals. Similarly the next four or $e$ digits 0100 are operative upon the trigger circuits E6 . . . E9 whereby trigger circuit E8 is turned on and the remaining three trigger circuits remain turned off. The next five or $b$ digits will be ignored as they are in no way concerned with the present arrangements but the last five or $f$ digits 10100 are effective through gate G330 upon the trigger circuits F0 . . . F4 to turn trigger circuits F0 and F2 on and to leave the remaining trigger circuits F0, F3 and F4 turned off.

The setting of the trigger circuits L0 . . . L4 becomes effective during the fourth beat A2 of the bar to control the Y-scan generator YSG of the main store S (Fig. 6) through the gates G606 . . . G610 while the output from trigger circuit L5 likewise becomes effective upon the shift circuit of the X-time base waveform XTB through gate G611 whereby line 35, which is the fourth line of the second column, becomes operative. At the same time the appropriate tube, number 4, is selected by the effect of the combined $e$ trigger circuit outputs upon the selection control terminals $wc$ of write unit 609 of each of the storage tubes 600 whereby only tube, number 4, is rendered operative. The contents of the said line 35 of tube 4 alone are accordingly read out through the read unit 606 of the related tube and are passed to the output busbar 615 and thence by way of gate G614 and lead 106 to the terminal 218 of the accumulator A (Fig. 2).

This input from the main store S arrives at the second input terminal 209 of the adding circuit 212 which is normally operative. The accumulator tube 200 is at this time operating on a particular one, known as the least significant, line of its four storage lines by reason of the resetting of each of the trigger circuits AYC0 and AYC1, which provide control input potentials to the terminals $yt1$, $yt2$ of the Y-shift generator AYG, at the beginning of the beat by the A2 waveform admitted through gate G205. The read unit 206 is operative as no erase voltage input is applied to its erase input terminal $re$ so that any previous content of such least significant line of the accumulator is read out and is fed to the first input terminal 208 of the adding circuit 212. The output from terminal 210 of the said adding circuit is accordingly representative of the sum of the number previously in the accumulator storage line and the number now arriving from the main store S. This sum-representing number signal is then applied to write input terminal $wi$ of write unit 209 and is written into the tube 200 on the said least significant line in place of the previously existing number.

The addition of two 20-digit numbers may result in the generation of a carry digit and this is automatically placed in the next storage line of the four available in the accumulator. This digit signal, however, occurs during the next beat and it is accordingly necessary with this operation to allow for a fifth beat to effect such required recording of any possible carry digit. It will be seen that the instruction 10100 is one which will cause opening of gate G902 (Fig. 9) whereby the A3 waveform (with subsequent generation also of the S3 and B4 waveforms) takes place. Reverting to the accumulator A, Fig. 2, the $p21$-pulse occurring at the beginning of the next beat A3 reverses the state of the trigger circuit AYC0 to change the control potential to terminal $yt1$ of generator AYG whereby the X-scanning level of the tube 200 is shifted to the next of its four storage lines so as to receive the aforesaid carry digit, if one occurs, during the active portion of the said fifth beat A3.

During the preceding beats S1, A1 and S2, the gate G900 of Fig. 9 has been held closed by the INV S1, INV A1 and INV S2 waveforms and in consequence no Prepulse signal has been generated. In the absence of an instruction requiring 5 or 7 beat (or more) operation the normal negative output from inverter 900 allows gate G900 to open in beat A2 whereby a Prepulse is generated at the end of that beat. The function code signal 10100 is, however, one which is operative upon the inverter 900 to provide a positive output from the latter to the gate G900. The inhibiting effect of the INV A2 waveform is consequently not overcome and the gate G900 is not opened during beat A2 but is opened during beat A3 to allow the $p1$-pulse of that beat to pass the gate and thus to trigger trigger circuit 901 whereby the next following B0 pulse, which occurs at the beginning of the sixth beat S3, produces a Prepulse signal and thereby initiates a fresh operative bar (see Fig. 11a—third Prepulse). The remaining two beats S3 and B4 overlap those of S1 and A1 of the next bar and are not used in the present instance. They allow, however, operations of extended length such as the multiplication of two 40-digit numbers which may extend to an 80-digit answer to take place in a part of the equipment such as the multiplier which is not shown in the present instance as it is not concerned with the understanding of the present invention. Such further parts are not concerned with the operations which always take place in beats S1 and A1 of a bar, namely control C, main store S and staticisor unit STU so that overlap is not objectionable.

Use may be made of either 20-digit number words when events follow the course already described or 40-digit number words. Such 40-digit number words are arranged as 2 20-digit halves and are stored in consecutive address lines in the main store S. The first 20-digit half-number word is read out in beat A2 as already described and then, by the application of the A3 waveform through gate G302 (Fig. 3) to the reversing input of trigger circuit L0, the 1 digit setting of the staticisor is advanced by one to cause the next address line, which contains the second 20-digit half-number to be read out in beat A3.

The next and subsequent bars follow a similar procedure of first altering the C.I. word held in the control tube 700 by addition of 1, then selecting the P.I. word dictated by such C.I. word from the main store S and transferring it to the P.I. line of control tube 700, then transferring it to the staticisors to select the required number word and to set up the necessary circuit routes for performing the required function and finally effecting the performance of such function with the chosen number word.

In addition to the apparatus already referred to the present invention makes use of the further units of the shift tube ST and shift counters SC illustrated in block form in Fig. 1 and shown in greater detail in Figs. 4 and 5 respectively.

*Shift tube ST*

The shift tube circuit of Fig. 4 comprises a storage tube 400 arranged with its associated amplifier 405 and read unit 406 and with an associated write unit 409 connected to the beam control electrode 403. This tube, however, does not have a completed regenerative loop by interconnection of the read-output terminal $ro$ of read unit 406 with the write-input terminal $wi$ of write unit 409 as sustained retention of a number word stored therein is not required.

The storage tube 400 is arranged to provide a total of 80 separate digit storage locations consisting of five lines each containing 16 digit positions. (In actual fact a total of 8 lines is available but only five are used.) The positioning of the tube beam upon any one of the 16 positions in any scanning line is controlled by X-shift potentials derived from an X-shift circuit 415 which is of the type shown in Fig. 14 and previously used for Y-shift generation purposes. Such circuit has, however, only four control valves and, in consequence, only four control input terminals. These four control valves are governed respectively by waveforms Z0, Z1, Z2 and Z3 whose generation will be referred to later. The Y-deflection of the tube beam to any one of the required five storage lines is governed by Y-shift circuit 416 again of a form similar to that shown in Fig. 14 but having only three control valves governed respectively by the Z4, Z5 and Z6 waveforms.

The write unit 409 has its input terminal $wi$ supplied from a number of sources including that via gate G402 from terminal 425 which is connected by lead 101 to the accumulator A. The control terminal $wc$ of write unit 409 is supplied with the SHIFT B0 waveform whose generation will be described later.

The read output terminal $ro$ is connected to terminal 413 and thence by lead 102 to the accumulator A. The erase control terminal $re$ of read unit 406 is supplied with the SOG waveform (Figs. 11j1 and 11j2) to be described later. Various other inputs and gate circuits are provided as shown in the drawing and the nature of these will be more readily apparent by detailed examination of the operation of the circuit under different conditions.

While the various cathode ray storage tubes of the other units described previously may be operated with any of the various modulation systems, such as dot-dash or focus-defocus, as described in the aforesaid literature reference of F. C. Williams and T. Kilburn in Proc. I.E.E., March 1949, the tube 400 is preferably operated with the focus-defocus type of display in view of its particular form of X-shift control.

*Shift counter*

The arrangements of the shift counter circuit are shown in Fig. 5 and comprise a group of 8 trigger circuits Z0 . . . Z7 which are connected as a serial counting chain in the usual way by joining their respective "0" output terminals each through a differentiating circuit to the reversing input terminal of the next subsequent trigger circuit. The trigger circuit Z6 is, however, coupled in this manner to the final trigger circuit Z7 only by way of a gate G508 which is controlled by the STAND waveform which will be referred to later. The trigger circuits Z0 . . . Z5 have their triggering inputs supplied from gate G502 through individual gates G510 . . . G515 which are controlled respectively by the $l0$ . . . $l5$ outputs from the main staticisor trigger circuits L0 . . . L5 (Fig. 3). The remaining two trigger circuits Z6 and Z7 are similarly connected with their individual gates G516 and G517 controlled respectively by the $e6$ and $e7$ outputs from the trigger circuits E6 and E7 of Fig. 3. In addition, however, each of the aforesaid triggering inputs is connected for the parallel supply thereto of triggering pulses derived either through gate G500 or from input terminal 501 which is connected by way of lead 100 to the accumulator. The resetting input terminals of each of the aforesaid trigger circuits Z0 . . . Z7 are likewise connected in parallel for supply through gate G501 or with the differentiated SOG waveform (Figs. 11j1 and 11j2). The first seven trigger circuits Z0 . . . Z6 can also be supplied with a resetting input from gate G507. In addition the reversing input terminals to trigger circuits Z4 and Z6 are arranged for selective supply of individual triggering pulses from gates G505 and G506 respectively.

The unit shown at 502 is a non-equivalence detecting circuit for providing an output pulse signal whenever the forms of two simultaneously applied input pulse trains are not identical. One form of such a circuit is shown in Fig. 16 and comprises input terminals 510, 511 for receiving the two pulse trains and connected as separate control inputs of gate G551 and also, by way of a buffer circuit as one control input to gate G550. The output from gate G551 after inversion in inverter 513 forms the second control input to gate G550 whose output is supplied to terminal 512. If each input train has a ("1") pulse gate G551 opens to feed inverter 513 which accordingly gives a positive output to close gate G550 and so prevent any output signal. If each input has no pulse ("0") gate G550 is again not opened but if one input train has a pulse ("1") and the other has no pulse ("0") then gate G551 is not opened and inverter 513 provides negative potential to gate G550 to allow such pulse from one or other of the input terminals 510, 511 to pass to terminal 512.

The symbol 503 is the conventional one for a delay circuit having, in this instance, a delay time of one digit-interval, i.e. 10 microseconds. It may consist of a mercury or electric delay line or a so-called shuffle circuit as is illustrated in the adding device of the aforesaid British Patent No. 693,424 or U.S. Patent No. 2,671,607.

The symbol 505 denotes a so-called "80-digit detector circuit," details of which are shown in Fig. 17 as comprising a gate G560 controlled by the INV A2, INV B0 and the "1" outputs from trigger circuits Z0, Z1, Z2, Z3 and Z6, diode D560 feeding negative output potential from such gate to charge a condenser C560 during the time when the aforesaid trigger circuits Z0 . . . Z6 have the configuration 1 δδ1111 (=79 or more), output gate G561 controlled by the INV DASH waveform and a diode D561 supplied with the INV DOT waveform.

The particular embodiment of the present invention as shown will now be described by consideration of its manner of operation in obeying different instructions.

*Shift operation*

In the performance of a shifting operation the PI word supplied from the control C to the staticisor unit STU in beat S2 has a particular combination (11010) of the function or $f$ digits indicative of that instruction in the digit intervals P15 . . . P19 of the signal train and also a digit configuration in the digit intervals P0 . . . P9 which determines (*a*) whether the shift is to be to the left, i.e. in a sense of increased significance or multiplication of the number concerned, or to the right, i.e. in the sense of lesser significance or divison of the number concerned and (*b*) the extent of such shifting measured in number of digit-interval places. These latter P0 . . . P9 digits are, of course in the same positions as the address selecting or $l$ and $e$ digits normally used for controlling the address selecting means of the main store S.

The arrangement of these digits to determine the extent and direction of shift is as follows. Assuming the digits to be numbered 0–9 from right to left then the integer N represented thereby will be $$-2^9\delta(9)+\sum\nolimits_{n=0}^{8}2^n\delta(n)$$

where $\delta$ ($n$) is the digit (either 0 or 1) in position $n$.

If N is equal to or greater than 0 but is less than 80, the contents of the accumulator A (Fig. 2) are shifted N places to the left. Under these conditions the N most significant digits of the accumulator contents are lost and the N least significant digits of the new accumulator content become 0's.

If N is equal to or greater than 80 the accumulator is cleared.

If N is less than zero but greater than —80 the contents of the accumulator are shifted to N places to the right and under these conditions the N least significant digits are lost and the N most significant digits become the same as the original most significant digit of the accumulator content, i.e. all "1's" or all 0's.

If N is equal to or less than —80 the accumulator becomes filled with digits all of which are the same as the original most significant digit of the accumulator content.

The shift operation is thus equivalent to multiplying the number in the accumulator by $2^N$ provided, of course, that the answer number is in range.

Thus, if the accumulator content contains A B C D E F G H I J K L M N O P, where each letter represents a group of 5 digits in an 80-digit number, then the instruction 11010 00000 00000 11001 (reading from right to left) will have the effect of altering the contents of the accumulator to F G H I J K L M N O P *f f f f f* (where *f* represents a group of 5 0's) since the aforesaid least significant 10 digits of the instruction (00000 11001) represent the number N=25.

If, on the other hand, the instruction had been 11010 00000 11111 00111 the effect would have been to change the contents of the accumulator to Z Z Z Z Z A B C D E F G H I J K (where Z represents a group of 5 1's) since the aforesaid least significant 10 digits of the instruction (11111 00111) would then represent the number N=—25. It is assumed in this instance, that the most significant digit of the group represented by the letter A is a 1.

The first beats S1 and A1 of the bar will follow a completely normal course involving, in beat S1, the alteration of the CI word in the control C followed by the application of that word to the staticisor unit STU so as to set up the address selecting staticisors L0 . . . L5, E6 . . . E9 associated with the main store S and, in beat A1, the reading out of the contents of the selected main store address (which will, of course, contain the PI word defining the shift instruction about to be considered, into the alternative storage line PI of the control C.

In the next or third beat of the bar, S2, such PI word (e.g. 11010 00000 00000 11001) is applied to the staticisor unit STU to set up the various individual sections thereof. The five function digits (11010) will, of course, exercise their controlling function in the usual way by passage through gate G330 (Fig. 3) to trigger circuits F0 . . . F4 which they will set up to provide the necessary combination of output potentials to produce an output function code signal on each of the control leads operable by that digit combination in the manner already described in connection with Fig. 15. The further 5 digits of the group P10 . . . P14 are again not concerned in this operation and, as they are all zeros, will not be considered. The remaining 10 least significant digits of P0 . . . P9 will set up the $l$ and $e$ staticisor sections consisting of trigger circuits L0 . . . L5, E6 . . . E9 shown in Fig. 3 by their passage from lead 104 through terminal 300 to gate G301 which is open during this beat S2 and so to the related triggering terminals of the 10 trigger circuits L0 . . . L5, E6 . . . E9. The appropriate selection of the different digits of the train is effected in the usual way by the application of the complete train through the various input control gates G310, G311 . . . G319 which are controlled respectively by the $p0, p1 \ldots p9$-pulse waveforms. During this beat S2, the various trigger circuits thus become set up according to the configuration of the aforesaid least significant 10 digits of the present instruction, giving a negative output at their respective output terminals $l0, l1 \ldots l5, e6 \ldots e9$ if the related digit was a "1" and an earth or positive output if the related digit was a "0." Such trigger circuits were previously all reset to their normal off or "0" indicating state, at the beginning of beat S2 by the leading edge of the LBO waveform pulse applied through gates G300 and G303.

Referring now to the shift counter SC of Fig. 5, at the commencement of the next beat, A2, the trigger circuits Z0, Z1 . . . Z7 are all reset to their off state at the commencement of the beat by the leading edge of the LBO waveform pulse applied through gate G501 which is open during beat A2 under the condition of the particular function signal denoting the present shift operation. In the digit-interval P7 of this same beat A2, these trigger circutis Z0, Z1 . . . Z7 are constrained to take up states similar to the trigger circuits L0 . . . L5, E6 and E7 of the $l$ and $e$ staticisor sections (Fig. 3) by the use of the outputs from the latter trigger circuits to control, respectively, a series of gates G510, G511 . . . G517 which are in the individual triggering input paths to the respective trigger circuits Z0 . . . Z7 from gate G502 which is supplied with the $p7$-pulse and A2 waveforms and is also controlled by the particular function code signal for the present shift operation and two further inputs, INV EX (—) and INV EX (+) which, for the present moment, can be regarded as being continuously negative. After the digit-interval P7 of beat A2 the trigger circuits Z0 . . . Z7 are therefore set to a condition corresponding to the related trigger circuits of the staticisor unit STU and consequently represent the number of places and direction through which the accumulator contents are to be shifted. In the particular example being first considered, which is a shift to the left the digit P7 of the instruction is a 0 and in consequence the trigger circuit Z7 will be left in its reset condition so that the output Z7 therefrom is positive.

Referring now to the shift tube circuit of Fig. 4 it will be seen that the four control input terminals of the X-shift circuit 415 are connected respectively to the Z0, Z1, Z2 and Z3 output terminals of the trigger circuits Z0 . . . Z3 of Fig. 5 so that, according to the particular set condition of these four trigger circuits so the beam of the shift tube 400 will be positioned in a particular one of the 16 positions extending horizontally across the tube screen.

The three control input terminals of the Y-shift circuit 416 are likewise connected respectively to the outputs Z4, Z5 and Z6 of the trigger circuits Z4 . . . Z6 of Fig. 5 so that, in accordance with the setting of these three trigger circuits so the tube beam will be positioned in a particular one of the five different scanning line levels.

After the setting of the trigger circuits Z0 . . . Z6 in the interval P7 of beat A2 as described above, the beam of tube 402 will thus be deflected to a particular one, indicative of the integer N, of the 80 separate digit storage positions available.

At the beginning of the same beat A2 the trigger circuit SF (Fig. 4) will be triggered to its on state by the input derived through gate G400 which is controlled by the A2 waveform and by the function code signal denoting a shift operation and upon being thus set the SF output waveform derived therefrom will go negative (see Fig. 11$k$1).

At the commencement of the next following beat, A3, the trigger circuit SIG (Fig. 4) is triggered to its on state by the output from gate G401 which is controlled by the A3, the LBO and the SF waveforms. Upon being thus triggered, trigger circuit SIG provides a negative output pulse of the SIG waveform as shown in Fig. 11$i$1.

Referring now to the accumulator A shown in Fig. 2, the application of the A3 waveform to gate G200, which is controlled by the SF waveform (now negative), causes the application of a resetting pulse to each of the trigger circuits AYC0 and AYC1 whereby each of these, if previously in a different condition, are shifted to their reset state which, as already explained causes the least significant line $a0$ of the four storage lines $a0, a1, a2$ and $a3$ of the accumulator tube 200 to be scanned. The regenerative loop of the accumulator tube circuit is completed through gate G201 since the INV (10$\delta\delta$) function code potential will still be negative.

At the beginning of beat A3 the least significant line $a0$ of accumulator tube 200 is therefore being operated upon. By reason of the application of the $p21$-PULSE of each beat to the reversing input terminal of the trigger circuit AYC0 each of the four scanning positions of the beam in tube 200 will be passed through in turn during beats A3 and the three following beats S3, B4 and S5 so that the entire contents i.e. 4 20-digit words, of the accumulator will pass through the gate G201, which is open at this time, back to the write input terminal 210 so as to be regenerated. Such accumulator content signal is also made available at output terminal 214 which is connected by lead 101 to terminal 425 of the shift tube (Fig. 4).

Referring again to Fig. 4, the input from the accumulator A thus made available at terminal 425 is applied by way of gate G402 to the write input terminal $wi$ of the shift tube write unit 409. The gate G402 is opened at this time by the SIG waveform, the SF waveform through gate G403 and the other waveforms INV EX (+) and INV EX (—) which are assumed, as before, to be continuously negative-going. In consequence, at the commencement of beat A3 the 80-digit number word in the accumulator will commence to be recorded in the shift tube 400 with the first digit P0 thereof located in the position determined by the previous setting of the trigger circuits Z0 . . . Z6 of the shift counters of Fig. 5.

The various trigger circuits Z0 . . . Z7 of the shift counter (Fig. 5) are counter-connected as shown, between an output terminal of one trigger circuit and the common reversing terminal of the next subsequent trigger circuit by way of a differentiating circuit while the common reversing terminal of the first trigger circuit Z0 is supplied by way of an inverter 500 with the DASH waveform supplied through gate G503 which is controlled by the INV B0 waveform and also by the Shift Blackout (SHIFT B0) waveform generated from the INV SF, the INV S2 and the INV A2 waveforms by the arrangements shown. Such SHIFT B0 waveform is shown in Fig. 11m1. In consequence, the trailing edge of each DASH pulse except those during the blackout period will trigger the chain of trigger circuits Z0 ... Z7 one step during each of the digit-intervals P0 ... P19 of each beat so that the setting condition of the trigger circuits will be advanced by one step at each digit position thereby causing the beam of tube 400 to move through each of the 80 digit storage locations therein successively commencing at the position determined by the initial setting N which was controlled by the form of the original instruction.

The 80-digit detector circuit 505 (Fig. 5), comprising the arrangements shown in detail in Fig. 17 provides an output pulse when the setting of the counter chain represents the 80th digit position so that when the last digit position in the fifth line of the tube 400 has been operated upon, the output from the 80 digit detector 505 goes negative and provides, during the first 3 microseconds of the following 10 microsecond digit interval, a negative pulse which is applied to reset all of the trigger circuits Z0 ... Z6. At the same time the trigger circuit SF, Fig. 4, is reset by the same output from the 80-digit detector 505 so that the SF waveform now goes positive again (Fig. 11k1). This closes gate G402 (Fig. 4) by reason of the removal of the opening potential previously supplied through gate G403 so that the remainder of the accumulator number arriving after the 80th digit storage position in the tube 400 is reached, does not pass in to that tube. In the remaining digit storage positions of the tube 400 "0" signals are written as the counter chain of trigger circuits Z0 ... Z6 is progressively stepped through the count positions 0 to (N—1).

During the four beats A3, S3, B4 and S5 concerned, the output from the shift tube 400 is inhibited by the application of the INV SOG waveform (see Fig. 11j1) which is negative-going at this time to the erase terminal re of the read unit 406. The SOG and INV SOG waveforms are generated by the trigger circuit SOG, Fig. 4, whose triggering input is derived by way of a slow differentiating network from the "0" or INV SIG output terminal of the trigger circuit SIG so that the trigger circuit SOG is triggered on only when the SIG waveform goes positive.

At the end of the four beat period involved in transfer of the 4×20 digit number words in the accumulator tube 200 to the shift tube 400, i.e. at the end of beat S5, the trigger circuit SIG is reset by the INV AYC1 output from the trigger circuit AYC1 (Fig. 2), so that the SIG waveform goes positive again and the SOG waveform goes negative as just explained. Due to the supply of the SHIFT B0 waveform (Fig. 11m1) the gate G503, Fig. 5, continues to be held open whereby DASH pulses, except during the blackout periods, continue to be applied to the counter-connected chain of trigger circuits Z0 ... Z7 of the shift counters so as to continue the progressive stepping-on of these. At the end of beat S5 however the leading edge of the SOG waveform (Fig. 11j1) is applied to the reset terminals of all of the aforesaid trigger circuits so that they are all reset to zero whereby, at the commencement of the following beat S6, the position of the tube beam in the shift tube 400 is on the first or 0 position of the 80 separate digit storage locations. During the following beats S6, S7, B8 and S9 which complete the bar, the 80 digit positions of the shift tube 400 are therefore operated upon in the squence 0, 1, 2 ... 79. During these four beats the output from the shift tube 400 is not inhibited as the INV SOG waveform, applied to the erase input terminal re of the read unit 406 of the tube, is now positive (see Fig. 11j1), so that such output can pass from the read output terminal ro of the read unit 406 to the terminal 413 which is connected by lead 102 to the input terminal 215 leading to the write input terminal wi of the write unit 209 of the accumulator storage tube 200, Fig. 2. The 80 digits stored in the shift tube 400 are thus read out in the order 0 ... 79 and transferred back into the accumulator tube 200 on lines a0, a1, a2 and a3 which are scanned in succession during these four beats consequent upon continued application of the p21-pulse to the common reversing input terminal of the accumulator Y shift trigger circuit AYC0. During the same interval of time the SOG waveform (Fig. 11j1) is applied to the erase terminal re of the read unit 206 of the accumulator tube 200 to inhibit the output derived from the signal plate 204 whereby the previous number stored therein is erased and is replaced by the new and now-shifted number.

At the end of the fourth of these further beats, i.e. beat S9, the INV AYC1 waveform again goes negative thereby resetting the trigger circuit SOG, Fig. 4, and terminating the negative period of the SOG waveform, Fig. 11j1. This marks the end of the shift operation.

During the obeying of a shift instruction as described the Prepulses (Fig. 11a1), which mark the commencement of each new operational bar and which are generated in the manner already described with reference to Fig. 9, are inhibited by the INV SIG waveform (Fig. 11i1) applied to gate G900, Fig. 9 until the end of beat S6. The remaining beats S7, B8 and S9 can, therefore, overlap beats S1, A1 and S2 of the next bar.

The alternative condition with a shift of N places (of not more than 80) to the right will next be described.

During the digit-interval P7 of beat A2 the trigger circuits Z0 ... Z7, Figure 5, take up similar states to the staticisor trigger circuits L0 ... E7 as already described but trigger circuit Z7 is now set so that its output Z7 goes negative as the P7 digit of the instruction is now a "1." The output from trigger circuit Z7 is applied to the gate G504 which is controlled also by the A2 waveform and by the SF waveform (Fig. 11k1). As the SF waveform has gone negative and the A2 beat is present, a pulse will be applied to the reversing input terminal of each of trigger circuits Z4 and Z6 (values 16 and 64 respectively) whereby 80 is added to the numerical setting of the chain of trigger circuits Z0 ... Z6 (gate G508 remains closed). Thus, at the end of beat A2, 80—N is set up on the trigger circuits Z0, Z1 ... Z6. During the four following beats, A3, S3, B4 and S5, the output number word from the accumulator tube 200 is applied through terminal 425 to the gate G402 of the shift tube circuit, Figure 4, in the manner already described but as both of the gates G403 and G404 are now closed since the INV Z7 and INV SF waveforms are both positive, the gate G402 is also closed and passage of the accumulator number is blocked. A further gate G405 which is controlled by the SF and Z7 waveforms as well as the INV EX(+) waveform already considered negative, provides a negative output for application to the gate G406 which is controlled by the output from the trigger circuit 240, Fig. 2, known as the A-sign flip-flop, of the accumulator A, which has previously been set in accordance with the value of the most significant digit stored in the accumulator tube by the opening of gate G210 during the P19 digit-interval of beat B4 under the influence of the function code signal (10100) through gate G213. It will be appreciated that negative numbers are expressed in the usual way by the complement method involving a "1" digit in the most significant position of a number word to denote negative sign and a "0" digit in such position to denote positive sign.

If the A-sign flip-flop output is positive, indicative that the most significant digit was a "0," the gate G406 remains closed and a series of 0's is caused to be written by the write unit 409 of the shift tube 400 into the various digit storage positions of the tube over the range of from digit positions 80—N (where the operation commenced) to the final storage position 79 of such shift tube. If, on the other hand, the A-sign flip-flop output is negative, indicative of the most-significant digit being a "1" then a series of "1" signals are written in. When the digit storage position 79 of the shift tube 400 is reached the trigger circuits Z0 . . . Z6 of the shift counter, Figure 5, are reset by the operation of the 80-digit detector 505 in the manner already described while, at the same time, the trigger circuit SF, Figure 4, is also reset to terminate the SF waveform. This causes gate G405, Figure 4, to give a positive output thereby closing the gate G406, if it was previously open, and preventing the continued writing of a series of 1's into the shift tube 400 if the A sign flip-flop 240 (Fig. 2) had been set to indicate a most significant "1" in the accumulator number. At the same time the gate G404 is opened thereby opening gate G402 to allow the remainder of the number signal from the accumulator which is still to arrive whilst the waveform SIG is negative to pass into the shift tube 400 for location in digit storage positions 0 to 79—N of that tube. The remainder of the operation is thereafter the same as that already described for a left shift.

The reason for the application of the INV A2 waveform to the gate G560 of the 80-digit detector 505 (see Fig. 17) is to prevent the various trigger circuits Z0 . . . Z7 being reset during beat A2 of a negative shift as counting occurs when 80 is added into the Z0 . . . Z7 trigger circuits during P11 and P15 digit-intervals of that beat and it is possible that at some stage the Z trigger circuits would hold 80.

The operation when the number of places of shift specified by the digits P0 . . . P9 of the instruction, exceeds either 79 to the left or 80 to the right will now be considered.

As previously explained the address portion of the instruction can be considered as an integer in the range where N is equal to or greater than —512 but is less than 511 and cases already dealt with have covered the range where N is equal to or greater than —80 but is equal to or less than 79.

Referring to Figure 4 it will be seen that the waveform EX(—) is derived from a gate G407 which is controlled by the output from the E9 staticisor and by the shift instruction (11010) as well as by a combination of other waveforms including either the INV e7, the INV e8 or the output from a gate G408 which has two controlling inputs comprising the INV e6 and the or'ed combination of the INV l4 or INV l5 waveforms. Similarly the INV EX(+) waveform is derived by a further combination of waveforms as shown including the or'ed combination of the e9 and an instruction (11011) with the output from a gate G409 having three controlling inputs the INV e7, the INV e8 and the or'ed combination of the INV e6 and the output from a further gate G410 which has two controlling inputs, the INV l4 and INV l5 waveforms.

The EX(—) waveform is negative-going during a shift order if the address digits of that order consist of any of the following combinations:

(a) 10δδδ δδδδδ=N=—512 to —257.

(b) 1δ0δδ δδδδδ=N=—256 to —129 as well as part of (a).

(c) 1δδ00 δδδδδ=N=—128 to —97 as well as part of (a) and (b).

(d) 1δδ0δ 0δδδδ=N=—96 to —81 as well as part of (a), (b) and (c).

In consequence, waveform EX(—) is negative-going if the number of places of shift to the right exceeds 80 and conversely the INV EX(—) waveform is positive under such conditions.

Similarly the INV EX(+) waveform is negative-going if the address part of the instruction consists of the following combinations of digits:

(e) 1δδδδ δδδδδ=N=—512 to —1.

(f) δ000δ δδδδδ=N=0 to 63 as well as part of (e).

(g) δ00δ0 0δδδδ=N=64 to 79 as well as part of (e) and (f).

Thus INV EX(+) is negative if the number of places to shift is included in the range already covered and is otherwise positive. It will therefore be seen that the previous assumptions regarding the EX(—) and INV EX(+) waveforms are justified under the conditions already dealt with in detail. For excessive shifts to the left, INV EX(+) is positive so that the output from gate G502 in the shift counters of Figure 5 remains positive during beat A2 whereby all of the trigger circuits Z0 . . . Z7 remain in their reset state and are not altered in accordance with the setting of the trigger circuits of the staticisor unit STU. Similarly the outputs from gates G406 and G405 of the shift tube circuit, Figure 4, remain positive so that during beats A3 to S5, 0's are written into the digit storage positions 0–79 of the shift tube 400. For excessive shifts to the right, EX(—) is negative so that the outputs from gate G502 of the shift counter circuit, Figure 5, and gate G402 of the shift tube, Figure 4, remain positive. The shift tube 400 is thus filled during beats A3 to S5 with either all 0's or all 1's depending upon the condition of the A sign flip-flop 240 (Fig. 2) whose output is applied to gate G406, Figure 4. The operation during the remaining beats is as already described, the resultant filling of the shift tube 400 being transferred to the accumulator A.

The INV SF and INV SIG waveform applied to the gate circuit G302, Figure 3, in the path by which counting pulses are normally supplied to the L and F staticisor sections in the normal operation of the machine, causes the closing of this gate and prevents any alteration of the setting of the L and E staticisor sections during the A3 beat by the A3 waveform which is otherwise applied to this gate. If these staticisor sections were altered it would upset the operation of the gate circuits shown in Figure 4 which are used for generating the EX(—) and the INV EX(+) waveforms.

*Standardise operation*

The manner of operation in carrying out an instruction to "standardise" a number located in the accumulator A will now be described. Such an instruction is characterised by the function digit combination 11011 in the P.I. word which is read out from the selected address location in the main store S to the control C during beat A1 of the operative bar and is transferred from the P.I. line of the control tube to the staticisor unit STU during the following beat S2.

Such an order has the effect of shifting the number in the accumulator A either to the left or to the right until it is in a standard position. In the particular example being described this standard position is defined as follows in various circumstances.

(a) If the number in the accumulator A is positive and is not zero then there must be a most significant 1 in the accumulator A and its contents are then shifted to the right or to the left until this 1 occupies the digit position adjacent to and to the right of the binary point which is regarded as located between the second and third digits from the left. In other words such 1 will be in the third digit position from the left hand end of the accumulator number.

(b) If the number in the accumulator A is zero it remains so.

(c) If the number in the accumulator A is negative then the accumulator A must either be filled with 1's or else there is a most significant "0." If the latter is the case the contents of the accumulator A are shifted until this "0" occupies the digit position adjacent to and to the right of the binary point. In the opposite case where the accumulator is filled with 1's, the contents of the accumulator are shifted to the left until only the two left hand digit positions contain 1's and the rest of the accumulator is clear. The performance of this standardisation operation, in addition to effecting the required shift, also causes a record of the number N signifying the extent and sense of such shift, to be recorded in the 10 address digit positions P0, P1 . . . P9 of the storage lines in the main store S. The rest of the contents of this storage line is cleared. Such number N represents the sense and extent of shift in accordance with the previous description given in connection with straightforward shift operations.

Such numbers, known as "standardised" numbers, have the property that they can be added, subtracted or multiplied and the answers will be in range.

This standardise operation embraces two successive bars and makes use of the STAND waveform shown in Figure 11*l*2 and this is generated by the gate circuit combination shown in Figure 5 and comprising gate G518 having three controlling inputs, namely the function digit combination of the standardise instruction, the INV SIG waveform (see Fig. 11*i*2) and an input which may be either the A3, the S3, the B4 or the output from a gate G519 having two controlling inputs, namely, the A2 and INV SF (see Fig. 11*k*2) waveforms. This STAND waveform is normally positive-going and goes negative at the beginning of beat A2 of the first bar and remains negative through the following beats A3, S3 and B4 of that bar and then goes positive and remains so.

The SF waveform, generated by trigger circuit SF, Figure 4, cannot go negative at the beginning of beat A2 as in the previous shift instructions since the gate G400 is now closed. The trigger circuit SF is now set at the beginning of beat S3 through gate G413 controlled by the S3 and STAND waveforms. This alternative form of the SF waveform is shown in Figure 11*k*2. Referring now to Figure 5, at the beginning of beat A2 following the introduction of the P.I. word containing the standardisation instruction, the trigger circuits Z0 . . . Z7 are all triggered into their "on" condition by a signal from the gate G500 which is controlled by the STAND, LB0 and A2 waveforms. The chain of trigger circuits thus registers, initially, a series of 1's. During beats A2 to B4 inclusive, the contents of the accumulator A, which scans its four lines in the usual order, *a*0, *a*1, *a*2 and *a*3) during these beats under the control of its associated trigger circuits AYC0 and AYC1 (Figure 2) passes through the direct path regeneration gate G201 under the usual regeneration process and, in addition, a similar output is made available at terminal 213 of the accumulator and is passed over lead 100 to the input terminal 501 of the shift counters shown in Figure 5. The accumulator number signal is applied from this terminal through gate G509 controlled by the STAND waveform (Fig. 11*l*2) and therefore open, to a not-equivalent circuit 502. One input terminal 510 of this not-equivalent circuit, which is of the form already described with reference to Fig. 16, is supplied directly with the incoming accumulator number while the other input terminal 511 is supplied with the same number signal but by way of a 1-digit-interval delay 503. In consequence of this arrangement, the not-equivalent circuit 502 provides a negative output pulse only when the two inputs thereto are in opposite states and has a positive output at all other times including those when the two inputs are of the same state. Thus if two consecutive digits of the number signal from the accumulator are different, a pulse is emitted from the not-equivalent circuit 502 during the more significant one of the two digit periods involved. These pulses are then fed to an inverter 504 and through a long differentiating network as a parallel triggering input to each of the trigger circuits Z0 . . . Z7.

The previous chain of triggering pulses to the common reversing terminal of the first trigger circuit Z0 through gate G503 is maintained, as in the previous "shift" operation, and a series of pulses will be applied to the counting chain during each of the digit intervals of the four beats except, of course, those of the blackout periods. Regular counting thus occurs, in the counting chain, of the 80 pulses which will be supplied during these four beats, the first pulse in beat A2 serving to reset the counter chain entirely to zero in view of its previous fully set condition. Each time a non-coincidence pulse is emitted from the circuit 502 however, the counter chain will be set again to the all "1" state and the counting of the input digits through gate G503 will commence all over again.

In explanation of the operation thus effected, suppose that the digit positions of the accumulator are numbered from 0–79 in order; suppose also that the digit position N holds a "1" signal and the further positions thereafter of $N+1$ to 79 all hold "0"s. Then during the 10 microsecond digit period, somewhere in beats A2 . . . B4, corresponding to digit position $N+1$, a pulse will be emitted from the not-equivalent circuit 502 thus setting all of the trigger circuits Z0 . . . Z7. Such trigger circuits then proceed to count the remaining pulses from gate G503 up to the end of beat B4 and there will be $79-N+1$ of these pulses. In view of the point already noted that the first pulse after such setting of all of the trigger circuits merely returns such circuits to an all-zero state, such setting effectively puts $-1$ on to the number counted so that at the end of beat B4 the Z trigger circuits will hold the number $77-N$. On consideration this will be seen to be the number of places of shift required in order to standardise the number in the accumulator giving the arbitrary digit point position as being that between the second and third digits from the right hand end as previously explained.

As a numermical example supposing the accumulator A contained the number 00.0001 . . . so that N is equal to 74, the shift required to standardise the number will be 3 places to the left. If, on the other hand the accumulator A had contained the number 01.00 . . . so that N is equal to 78 the shift required will be $-1$ places, i.e. 1 place to the right.

At the beginning of beat S3, the SF waveform generated by the trigger circuit SF will go negative due to the triggering of such trigger circuit by the output from gate G413. At the beginning of this beat also a new Prepulse is formed (see Figure 11*a*2) but by reason of the INV SF waveform applied to gate G700 (Fig. 7) the usual p0-pulse is not released and $+1$ is not added to the contents of the C.I. line of the control storage tube 700. As a result of this suppression of the $+1$ signal on the C.I. line, the same P.I. word as was operative during the previous bar is again used and is set up on the various staticisors of the staticisor unit STU whereby the L and E staticisors shown in Figure 3 retain their previous setting configuration. The beats S1 and A1 of the second bar overlap the beats S3 and B4 of the previous bar. During beats S2 and A2 of the second bar, the SHIFT B0 waveform (Fig. 11*m*2) from gate G520 (Fig. 5) goes positive. This prevents the DASH waveform from being sent to the counterinput of trigger circuit Z0, thus leaving the number registered by trigger circuits Z0 . . . Z6 unchanged and also, acting through the write control terminal wc of write unit 409 (Fig. 4) prevents the beam of tube 400 from being turned on. The number recorded in the tube 400 is thus left unchanged during beats S2 and A2. During A2 of the second bar, the group of gates G420, G421 . . . G426 of Figure 4 co-operate to make a pulse train waveform which represents, in binary number form, the number of shifts required to effect the standardisation operation.

This is due to the interconnection of such gates with the various related trigger circuits Z0 . . . Z7 of Figure 5 and the application to the gates of the related p-pulses. This output signal train is then fed through gate G412 which is controlled by the A2, SF and an inverse version of the function code signal for the previously described straightforward shift operation, to terminal 414 which is connected over lead 105 to the input terminal 612 of the main store S (Fig. 6) so that this number-representing signal train enters the main store and is recorded on the line of the store tube 600 specified by the $l$ and $e$ digits of the standardisation instruction.

At the beginning of beat A3, the SIG waveform (Fig. 11$i$2) goes negative as before and the shift operation now proceeds exactly as previously described for an ordered shift operation.

During a standardisation instruction the EX(—) waveform is always positive and the INV EX(+) waveform is always negative. This is in accordance with the fact that the number of places of shift required will never be excessive under the conditions of a standardisation instruction.

The particular case where the digit position N of the accumulator signal contains a 0 and the positions $N+1$ to 79 each contain 1's is treated in exactly the same manner. In the case where the accumulator is filled with 1's completely, the non-equivalence detecting circuit 502 emits a pulse during the P0 period of beat A2 since the input to the unit delay 503 in the previous P23 digit-interval of beat A2 is positive (being in the blackout period). Thus the number 78 is set up on the Z trigger circuits by the end of beat B4 so that this number goes to the line of the main store S and the correct number of places are shifted. In the case where the accumulator is filled with 0's the non-equivalence detecting circuit 502 never emits a pulse so that 79 is set up on the Z trigger circuits. This number goes to the main store S as before and the contents of the accumulator A are shifted 79 places to the left but this, however, does not alter them.

Although the invention has been described with reference to a particular apparatus arrangement it will be obvious that its general principles, as defined in the appended claims may be carried out with other forms of apparatus.

We claim:

1. An electronic digital computing machine arranged for operation with number words represented in the serial mode by trains of digit-representing electric pulse signals whose individual power significance values are determined by the relationship of their timing with respect to the successive digit signalling time intervals of the operational rhythm of the machine, which includes controlled shifting arrangements, operative under the control of a single instruction word fed to the control system of the machine, to shift by one machine operation cycle each of said digit-representing pulse signals of a selected number word by any chosen number of said digit signalling time intervals in the chosen one of alternative forward or backward directions, said shifting arrangements comprising register means for recording in separate and individually accessible digit storage locations each of the successive digit-representing signals of an applied number word and reading means for successively reading out the stored signal content of each of a predetermined number of said digit storage locations at time instants having a desired predetermined relationship to said operational rhythm of the machine.

2. An electronic binary digital computing machine as claimed in claim 1 which includes means operative under the control of said instruction word for determining the position of the most significant "1" value digit of said selected number word and for controlling said shifting arrangements whereby the latter impart such a degree of shifting of said number word that said most significant "1" value digit is brought to a position of predetermined power significance.

3. An electronic digital computing machine as claimed in claim 2 which includes means for providing an output signal which is indicative of the extent and direction of shift which has been imposed by said shifting arrangements under the control of said digit-position determining means.

4. An electronic digital computing machine as claimed in claim 1, in which said shifting arrangements comprise a separate number word signal storage device having a plurality of separately and immediately accessible storage locations for each of the individual digit signals of the number word signal to be dealt with, digit address selecting means for such storage device, said digit address selecting means including a cyclic counting means whereby successive digit storage locations in said storage device can be rendered operative in turn at the digit signalling rhythm of the machine and setting means by which the initial address location setting of said cyclic counting means can be altered to commence at any desired one of said successive digit storage locations by external control signals.

5. An electronic digital computing machine as claimed in claim 4 in which said separate number word signal storage device comprises an electrostatic cathode ray tube storage device of the so-called Williams' type including raster scanning beam deflection means and in which said digit address selecting means are arranged to control the deflection of the tube beam to commence its scanning motion at any one of the discrete digit storage locations on the tube screen.

6. An electronic digital computing machine as claimed in claim 4 in which said address selecting means comprises a series of two-stable-state trigger circuits which are counter-connected as a chain for progressive stepping of their setting condition by a single pulse input to the first trigger circuit of the chain and which are also each provided with an individual triggering input for effecting over-riding control of the setting condition of each individual trigger circuit.

7. An electronic digital computing machine operative with number words represented in the serial mode by trains of digit-representing electric pulse signals whose individual power significance values are determined by the relationship of their timing with respect to the operational rhythm of the machine and which includes controlled shifting arrangements operative under the control of a single instruction word effective in the control system of the machine for altering the numerical significance of a selected number word by imparting a predetermined degree of shifting to each of the individual digit signals of such number word, said arrangements comprising a separate number word signal storage device having a plurality of separately and immediately accessible storage locations for each of the individual digit-representing signals of the number word signal to be shifted and digit address selecting means for said storage device, said digit address selecting means including cyclic counter means whereby said address selecting means is altered to render successive digit storage locations in said storage device operative in turn one in each of the successive digit intervals of the machine rhythm and separate initial setting means operable by external control signals by which the initial address location setting of said address selecting means can be altered to any desired setting prior to control by said cyclic counter means.

8. An electronic binary digital computing machine which operates with number words represented in the serial mode by trains of digit-representing electric pulse signals whose individual power significance values are determined by the relationship of their timing with respect to the operational rhythm of the machine and which includes control shifting arrangements operative under the control of a single instruction word effective in the control system of the machine for imparting such a degree of shifting of the digit signals of an applied number word signal that the signal representing the most-significant "1" digit signal in said number word signal is brought to a position of predetermined power significance, said arrangements comprising a separate number word signal storage device having a plurality of separately and immediately accessible storage locations for each of the individual digit signals of the number word signal to be shifted, digit signal address selecting means for such storage device, said digit signal address selecting means including cyclic counter means whereby said address selecting means is altered to render the successive digit signal storage locations in said storage device operative in turn, one in each of the successive digit intervals of the machine rhythm, separate initial setting means by which the address location setting of said cyclic counter means can be altered to any desired setting by external control signals, means for detecting the position of the most-significant "I"-value digit signal of an applied number word signal and for providing output signals indicative of the position of said detected most-significant "1"-value digit signal and circuit means for applying said output signals as the control signals for said separate initial setting means of said cyclic counter means.

9. An electronic binary digital computing machine according to claim 8 which includes means for providing an output signal indicative of the extent and direction of shift which has been imposed by said shifting arrangements under the control of said most-significant "1"-value digit signal position determining means.

References Cited in the file of this patent

UNITED STATES PATENTS

| | | |
|---|---|---|
| 2,585,630 | Crosman | Feb. 12, 1952 |
| 2,634,052 | Bloch | Apr. 7, 1953 |
| 2,666,575 | Edwards | Jan. 19, 1954 |
| 2,700,502 | Hamilton | Jan. 25, 1955 |
| 2,719,670 | Jacobs | Oct. 4, 1955 |
| 2,755,994 | Williams et al. | July 24, 1956 |
| 2,767,908 | Thomas | Oct. 23, 1956 |
| 2,800,278 | Thomas | July 23, 1957 |

FOREIGN PATENTS

| | | |
|---|---|---|
| 1,059,408 | France | Nov. 10, 1953 |
| 709,110 | Great Britain | May 19, 1954 |
| 709,410 | Great Britain | May 26, 1954 |